(12) United States Patent
Oyaizu

(10) Patent No.: US 10,891,756 B2
(45) Date of Patent: Jan. 12, 2021

(54) IMAGE PROCESSING DEVICE, CHART FOR CALIBRATION, AND CALIBRATION SYSTEM

(71) Applicant: SONY CORPORATION, Tokyo (JP)

(72) Inventor: Hideki Oyaizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/331,592

(22) PCT Filed: Jul. 31, 2017

(86) PCT No.: PCT/JP2017/027684
§ 371 (c)(1),
(2) Date: Mar. 8, 2019

(87) PCT Pub. No.: WO2018/083848
PCT Pub. Date: May 11, 2018

(65) Prior Publication Data
US 2019/0362520 A1    Nov. 28, 2019

(30) Foreign Application Priority Data

Nov. 7, 2016    (JP) .................................. 2016-217509

(51) Int. Cl.
*H04N 7/18* (2006.01)
*G06T 7/80* (2017.01)
(Continued)

(52) U.S. Cl.
CPC ............ *G06T 7/80* (2017.01); *G01B 11/2522* (2013.01); *G01N 21/25* (2013.01); *G06T 7/60* (2013.01);
(Continued)

(58) Field of Classification Search
CPC . G06T 2207/30204; G06T 2207/30208; G06T 7/80
See application file for complete search history.

(56) References Cited

U.S. PATENT DOCUMENTS 10,185,876 B2 *   1/2019   Miyazaki ........... G06K 9/00624
2012/0069193 A1 *  3/2012   Ramegowda ........ H04N 17/002
                                                    348/164
(Continued)

FOREIGN PATENT DOCUMENTS

JP    2006-170648 A    6/2006
JP    2008-014940 A    1/2008
(Continued)

OTHER PUBLICATIONS

International Search Report and Written Opinion of PCT Application No. PCT/JP2017/027684, dated Oct. 17, 2017, 12 pages of ISRWO.

*Primary Examiner* — Fabio S Lima
(74) *Attorney, Agent, or Firm* — Chip Law Group

(57) ABSTRACT

There is provided an image processing device including a far-infrared acquisition unit that acquires a far-infrared image, a first extraction unit that extracts a plurality of first markers having a first temperature from the far-infrared image, and a far-infrared specification unit that specifies a position of each of a plurality of second markers having a second temperature in the far-infrared image based on a geometric relationship between the plurality of respective first markers.

14 Claims, 25 Drawing Sheets

(51) Int. Cl.
  *G01B 11/25*  (2006.01)
  *G01N 21/25*  (2006.01)
  *G06T 7/60*  (2017.01)
  *H04N 5/33*  (2006.01)

(52) U.S. Cl.
  CPC ..... *H04N 5/33* (2013.01); *G06T 2207/10048* (2013.01); *G06T 2207/30204* (2013.01)

(56) References Cited

U.S. PATENT DOCUMENTS

| | | | | |
|---|---|---|---|---|
| 2013/0216150 | A1* | 8/2013 | Kondo | H04N 19/59 |
| | | | | 382/238 |
| 2013/0335580 | A1* | 12/2013 | Guerreri | H04N 9/04 |
| | | | | 348/188 |
| 2014/0306939 | A1 | 10/2014 | Tamura | |
| 2015/0025655 | A1* | 1/2015 | Walther | G08G 1/0955 |
| | | | | 700/9 |
| 2016/0292826 | A1* | 10/2016 | Beall | G06K 9/2018 |
| 2017/0224257 | A1* | 8/2017 | Rogers | A61B 5/14532 |
| 2017/0244960 | A1* | 8/2017 | Ciurea | H04N 5/247 |
| 2018/0262748 | A1* | 9/2018 | Shibata | H04N 5/33 |
| 2019/0047226 | A1* | 2/2019 | Ishikawa | B29C 64/209 |

FOREIGN PATENT DOCUMENTS

| | | | |
|---|---|---|---|
| JP | 2008014940 A | * | 1/2008 |
| JP | 2014-206952 A | | 10/2014 |

* cited by examiner

FIG. 2
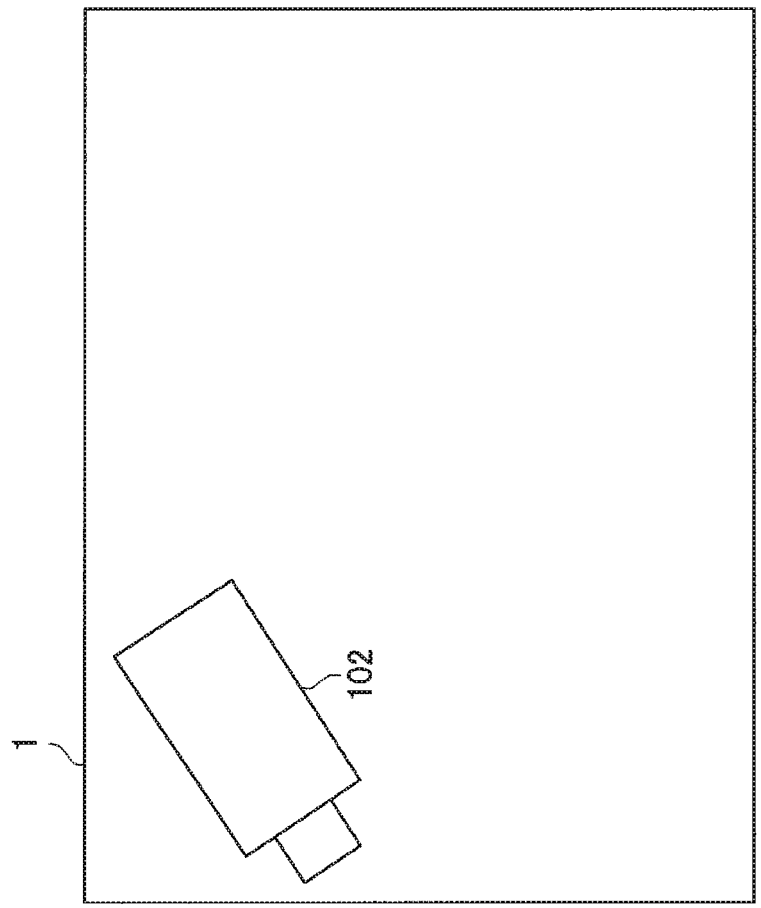
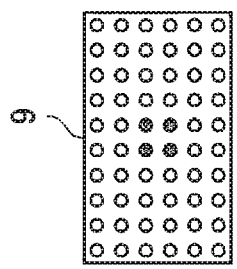

IMAGE PROCESSING DEVICE, CHART FOR CALIBRATION, AND CALIBRATION SYSTEM

CROSS REFERENCE TO RELATED APPLICATIONS

This application is a U.S. National Phase of International Patent Application No. PCT/JP2017/027684 filed on Jul. 31, 2017, which claims priority benefit of Japanese Patent Application No. JP 2016-217509 filed in the Japan Patent Office on Nov. 7, 2016. Each of the above-referenced applications is hereby incorporated herein by reference in its entirety.

TECHNICAL FIELD

The present disclosure relates to an image processing device, a chart for calibration, and a calibration system.

BACKGROUND ART

In recent years, far-infrared images captured by far-infrared cameras have been used for the purpose of night vision or the like. Far-infrared images are generated when imaging elements capture far-infrared rays emitted from objects by black-body radiation. The use of such far-infrared images enables subjects to be detected, for example, even under unfavorable conditions such as night time or bad weather. Such far-infrared cameras need calibrating to acquire desired images similarly to other cameras such as visible light cameras.

Cameras can be calibrated by using charts for calibration which are provided with a plurality of markers. Specifically, cameras are used to capture images showing charts, and the images are used to calibrate the cameras. For example, Patent Literature 1 discloses technology of calibrating a far-infrared camera by using a chart in which objects each having a different emissivity are alternately provided in a lattice pattern. In the chart according to Patent Literature 1, each of the objects described above can correspond, for example, to the marker described above.

CITATION LIST

Patent Literature

Patent Literature 1: US 2012/0069193A

DISCLOSURE OF INVENTION

Technical Problem

Incidentally, it seems desirable in the field related to far-infrared cameras to improve the calibration precision of far-infrared cameras. Specifically, a far-infrared camera is calibrated on the basis of the position of each marker in a far-infrared image showing a chart. Here, in the case where some of the markers are not shown in the far-infrared image showing the chart, it can be difficult to acquire the relationship between a marker on the far-infrared image and a marker in a real space. That can make it difficult to specify the position of each marker in the far-infrared image. Therefore, it is necessary to perform imaging such that all the markers are shown in a far-infrared image. Accordingly, it can be difficult to acquire a far-infrared image showing markers at the ends. That sometimes causes failure in sufficiently securing information used for calibration, so that the calibration precision can decrease.

Accordingly, the present disclosure proposes a novel and improved image processing device, chart for calibration, and calibration system that can improve the calibration precision of a far-infrared camera.

Solution to Problem

According to the present disclosure, there is provided an image processing device including: a far-infrared acquisition unit configured to acquire a far-infrared image; a first extraction unit configured to extract a plurality of first markers having first temperature from the far-infrared image; and a far-infrared specification unit configured to specify a position of each of a plurality of second markers having second temperature in the far-infrared image on the basis of a geometric relationship between the plurality of respective first markers.

In addition, according to the present disclosure, there is provided a chart for calibration, the chart including: a plurality of first markers configured to have first temperature; a plurality of second markers configured to have second temperature; and a base configured to have third temperature, and be provided with the plurality of first markers and the plurality of second markers. Relative positions of the plurality of respective second markers in a real space with respect to the plurality of first markers can be decided on the basis of a geometric relationship between the plurality of respective first markers.

In addition, according to the present disclosure, there is provided a calibration system including: a chart for calibration, the chart including a plurality of first markers configured to have first temperature, a plurality of second markers configured to have second temperature, and a base configured to have third temperature, and be provided with the plurality of first markers and the plurality of second markers; and an image processing device configured to calibrate a far-infrared camera with a far-infrared image showing the chart for calibration, the far-infrared camera capturing the far-infrared image. Relative positions of the plurality of respective second markers in a real space with respect to the plurality of first markers can be decided on the basis of a geometric relationship between the plurality of respective first markers. The image processing device includes a far-infrared acquisition unit configured to acquire the far-infrared image, a first extraction unit configured to extract the plurality of first markers from the far-infrared image, a far-infrared specification unit configured to specify a position of each of the plurality of second markers in the far-infrared image on the basis of the geometric relationship between the plurality of respective first markers, and a far-infrared calibration unit configured to calibrate the far-infrared camera on the basis of the position of each of the plurality of second markers in the far-infrared image.

Advantageous Effects of Invention

According to the present disclosure as described above, it is possible to improve the calibration precision of a far-infrared camera.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is a schematic diagram illustrating an example of a schematic configuration of a calibration system according to an embodiment of the present disclosure.

MODE(S) FOR CARRYING OUT THE INVENTION

Figure 1:
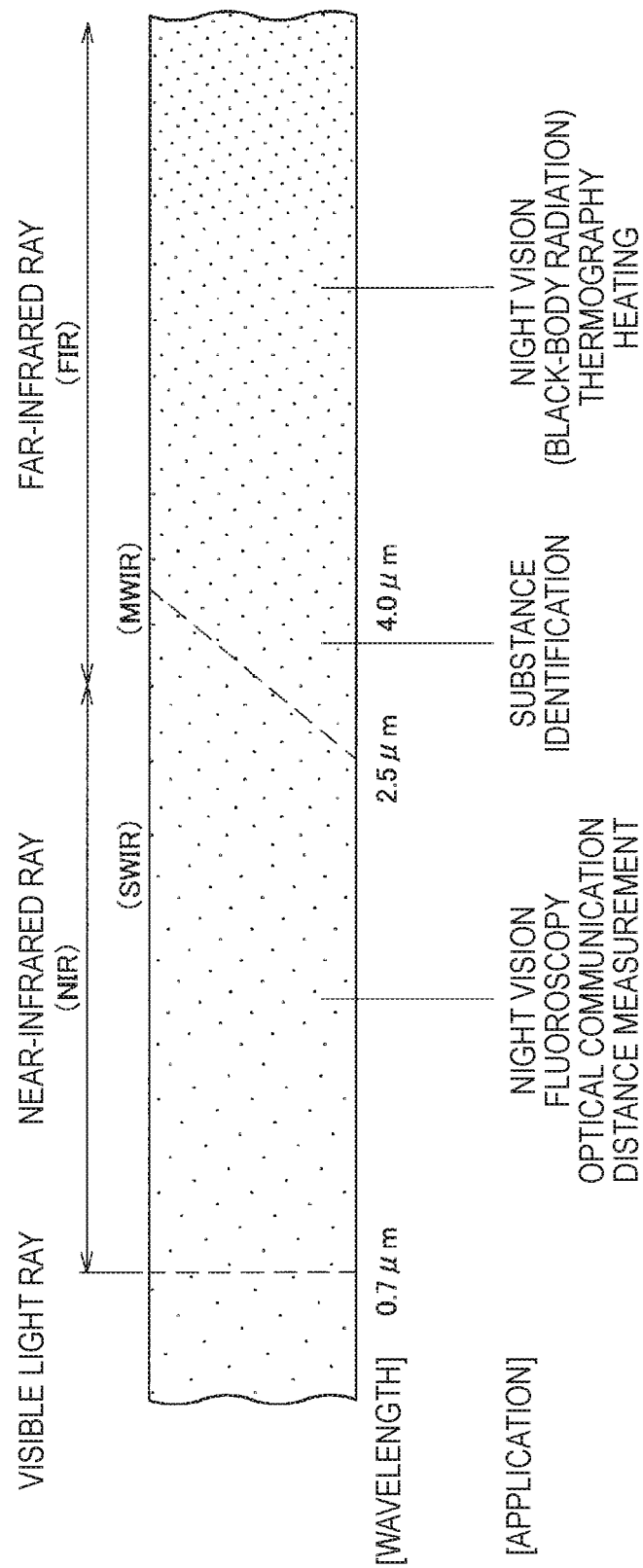
FIG. 1 is an explanatory diagram for describing various uses of an infrared image that depends on a wavelength.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Introduction
2. Calibration system
3. Image processing device
3-1. Hardware configuration
3-2. Functional configuration
3-3. Operation
4. Application examples
4-1. First application example
4-2. Second application example
5. Conclusion

1. INTRODUCTION

FIG. 1 is an explanatory diagram for describing various uses of an infrared image that depends on a wavelength. The horizontal direction of FIG. 1 corresponds to the wavelengths of infrared rays and the wavelengths are lengthened from the left to the right. A light ray that has a wavelength of 0.7 µm or less is a visible light ray, and the sight of a human senses the visible light ray. A wavelength region adjacent to the visible light region is a near-infrared ray region (NIR), and the infrared rays belonging to the NIR region are referred to as near-infrared rays. The upper limit of the wavelength of the NIR region differs depending on the definition, but ranges between 2.5 µm to 4.0 µm in many cases. A portion having a relatively great wavelength in the NIR region is also referred to as a short-wavelength infrared (SWIR) region in some cases. The near-infrared rays can be used for, for example, night vision, fluoroscopy, optical communication, and distance measurement. Normally, a camera that captures a near-infrared image first irradiates the area in the vicinity with infrared rays, and captures the reflected light. The wavelength region adjacent to the NIR region on the long-wavelength side is a far-infrared (FIR) region, and the infrared rays belonging to the FIR region are referred to as far-infrared rays. A portion having a relatively short wavelength in the FIR region is also referred to as middle-wavelength infrared (MWIR) region in some cases. Since an absorption spectrum specific to a substance is shown in the wavelength range of the middle-wavelength infrared rays, the middle-wavelength infrared rays can be used to identify the substance. The far-infrared rays can be used for night vision, thermography, and heating. Infrared rays emitted by black-body radiation from objects correspond to far-infrared rays. Therefore, a night vision device that uses far-infrared rays can generate a far-infrared image by capturing the black-body radiation from objects without radiating infrared rays. Note that the boundary values of the ranges of the wavelengths illustrated in FIG. 1 are merely examples. There are various definitions for the boundary values of classification of infrared rays, and the following advantages of the technology according to the present disclosure can be gained under any definition.

Since the energy of far-infrared rays emitted from an object and the temperature of the object have a correlation, a temperature difference between a plurality of objects shown in a far-infrared image generated by receiving the far-infrared rays can be detected from the far-infrared image. That makes it possible to distinguish a region in which a specific object is shown from other regions and extract it from the far-infrared image. Therefore, in a far-infrared image showing a chart in which a plurality of markers having temperature different from that of other parts is provided, it is possible to distinguish a region in which each marker is shown from other regions and extract it. Accordingly, the use of such a chart allows a far-infrared camera to be calibrated.

In the case where some of the markers are not shown in the far-infrared image showing the chart, it can be difficult, as described above, to acquire the relationship between a marker on the far-infrared image and a marker in a real space. That can make it difficult to specify the position of each marker in the far-infrared image. Therefore, it is necessary to perform imaging such that all the markers are shown in a far-infrared image. Accordingly, it can be difficult to acquire a far-infrared image showing markers at the ends. That sometimes causes failure in sufficiently securing information used for calibration.

Here, even in the case where some of the markers are not shown in a far-infrared image showing a chart, it is conceivable that the different shape of each marker provided in the chart causes the relationship described above to be acquired by identifying the shape of each marker on the far-infrared image. However, the resolution of a far-infrared image is lower than that of a visible light image, which can make it difficult to identify the shape of each marker.

In this way, information used for calibration is not sometimes secured sufficiently, so that the calibration precision can decrease. Accordingly, the present specification proposes a mechanism that can improve the calibration precision of a far-infrared camera.

2. CALIBRATION SYSTEM

First, with reference to FIGS. 2 to 6, the overview of a calibration system 10 according to an embodiment of the present disclosure will be described.

FIG. 2 is a schematic diagram illustrating an example of the schematic configuration of the calibration system 10 according to the present embodiment. The calibration system 10 includes an image processing device 1 and a chart 9, for example, as illustrated in FIG. 2. In the calibration system 10, a far-infrared image showing the chart 9 is captured by a far-infrared camera 102, and the image processing device 1 uses the far-infrared image to calibrate the far-infrared camera 102. Note that the following describes an example in which the far-infrared camera 102 is included in the image processing device 1, but the far-infrared camera 102 does not also have to be included in the image processing device 1. In that case, the image processing device 1 is implemented by a device that is a different entity from the far-infrared camera 102.

Figure 3:
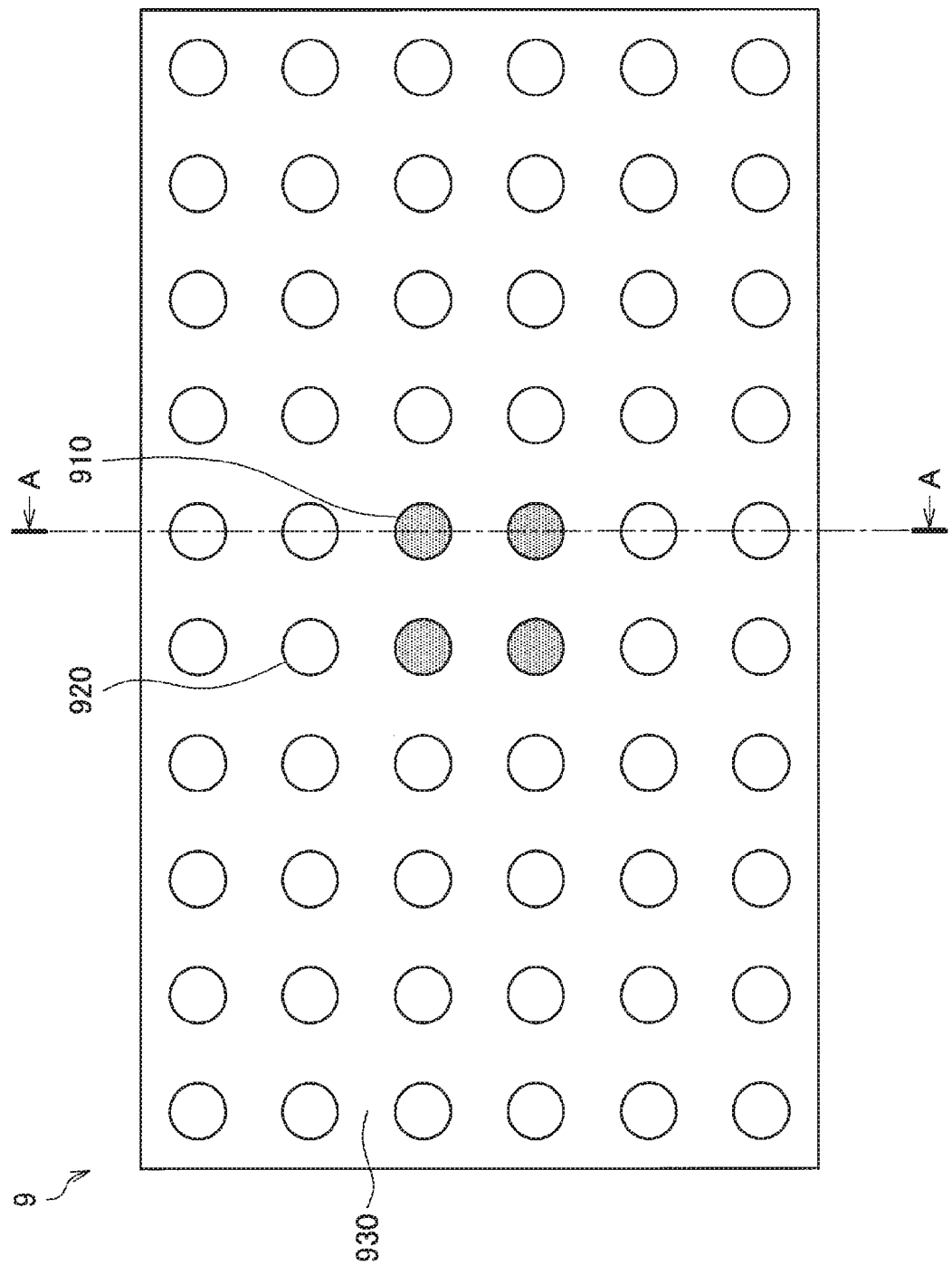
FIG. 3 is a front view illustrating an example of a chart according to the embodiment.
Figure 4:
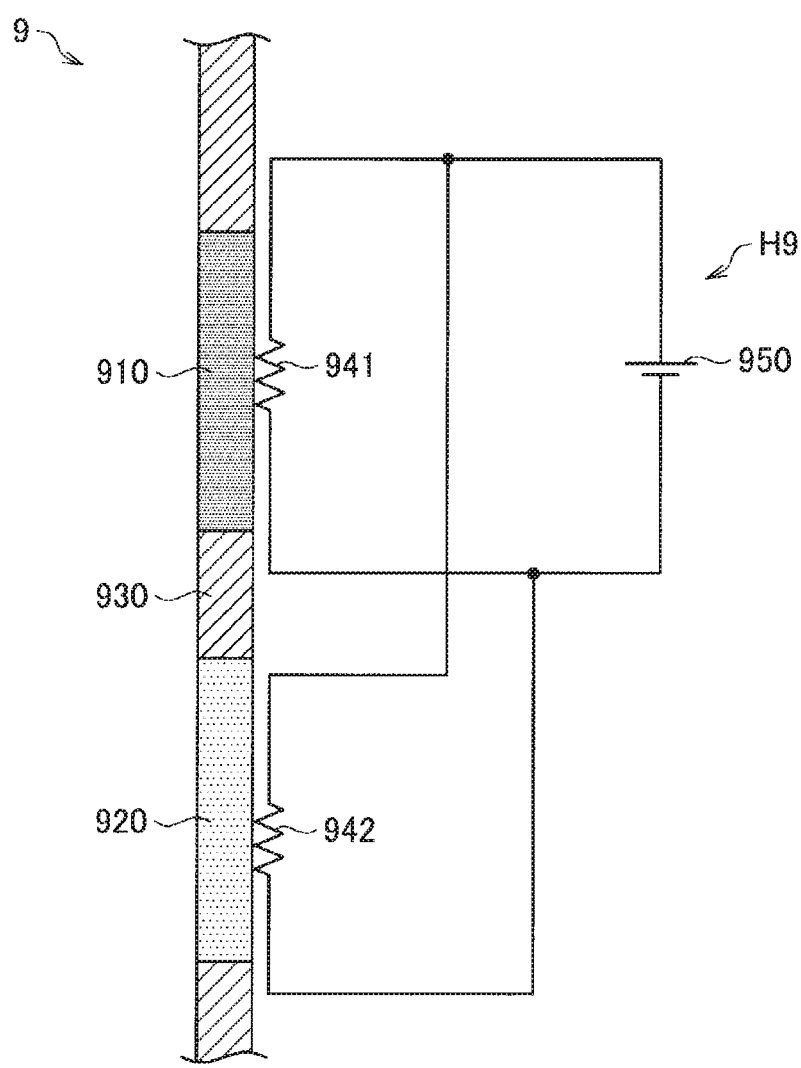
FIG. 4 is a schematic cross-sectional view illustrating an example of the chart according to the embodiment.
Figure 5:
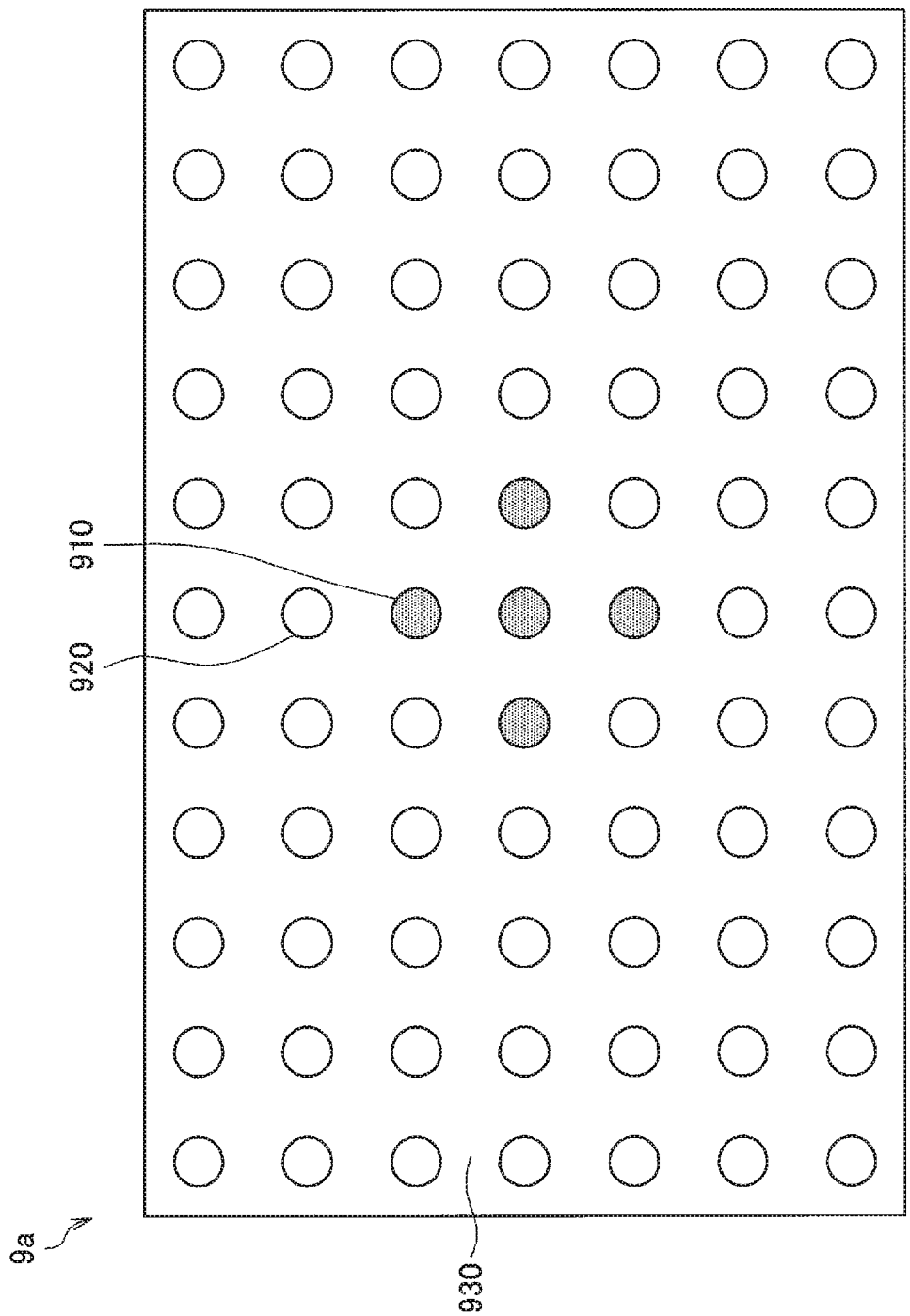
FIG. 5 is a front view illustrating another example of the chart according to the embodiment.
Figure 6:
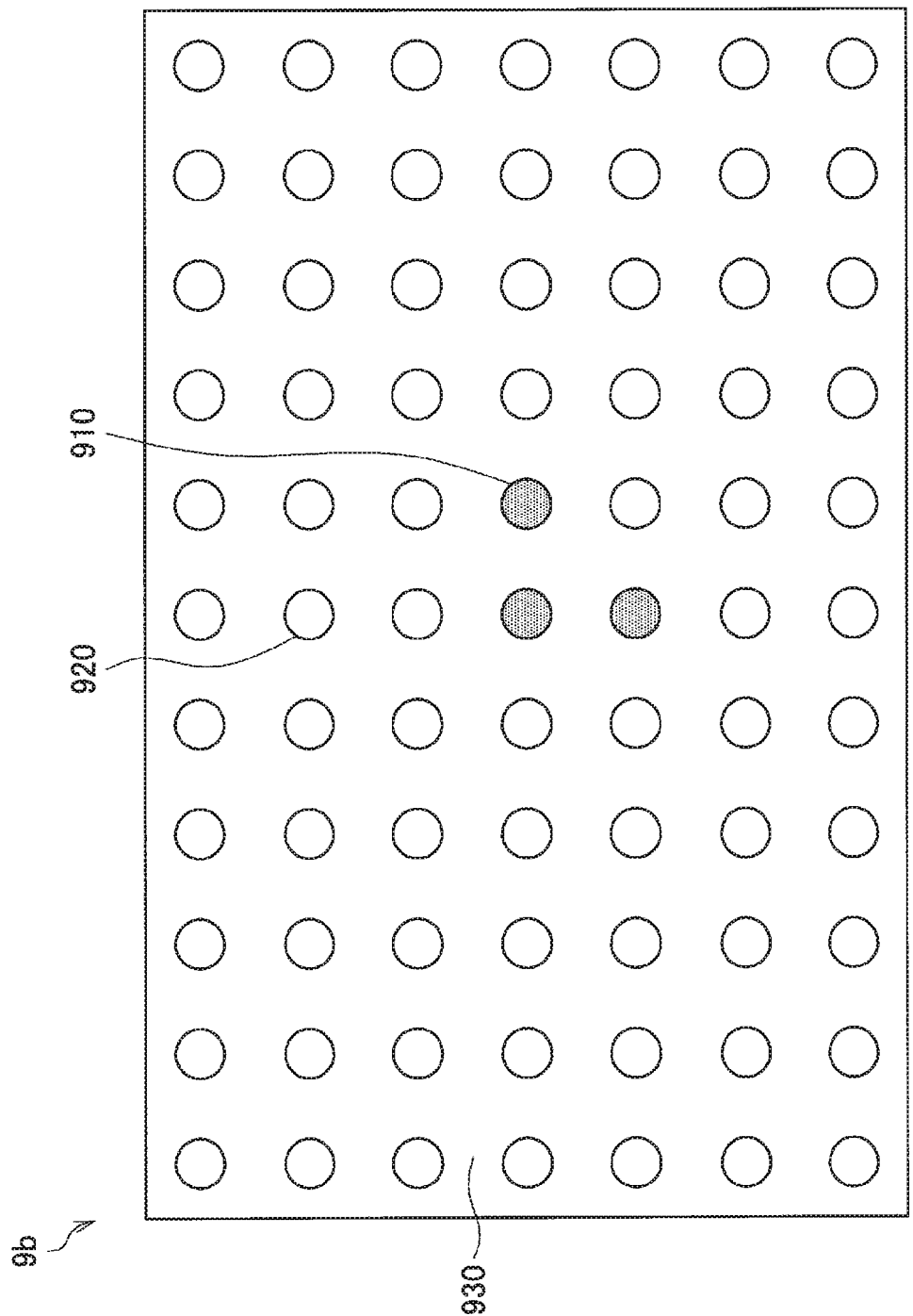
FIG. 6 is a front view illustrating another example of the chart according to the embodiment.

With reference to FIGS. 3 to 6, the chart 9 will be described below. FIG. 3 is a front view illustrating an example of the chart 9 according to the present embodiment. FIG. 4 is a schematic cross-sectional view illustrating an example of the chart 9 according to the present embodiment. Specifically, FIG. 4 is a schematic cross-sectional view for an A-A cross section passing through a first marker 910 and a second marker 920 illustrated in FIG. 3. FIGS. 5 and 6 are front views each illustrating another example of the chart 9 according to the present embodiment.

The chart 9 corresponds to a chart for calibration according to the present disclosure. As illustrated in FIG. 3, the chart 9 includes a plurality of first markers 910, a plurality of second markers 920, and a base 930. Note that the following also refers to the first marker 910 and the second marker 920 simply as markers in the case they are not distinguished in particular. In addition, in the case where a specific first marker 910 is distinguished from the others among the plurality of first markers 910, it is called with an alphabet added to the end of the sign. In addition, in the case where a specific second marker 920 is distinguished from the others among the plurality of second markers 920, it is called with an alphabet added to the end of the sign.

The first marker 910 has first temperature. The first marker 910 is provided to the base 930 as illustrated in FIG. 3. FIG. 3 illustrates the first marker 910 as a hatched part having a substantially circular shape. Note that the shape of the first marker 910 is not limited in particular, but may be a shape such as a substantially circular shape, a substantially elliptic shape or a substantially polygonal shape.

The second marker 920 has second temperature. The second marker 920 is provided to the base 930 as illustrated in FIG. 3. FIG. 3 illustrates the second marker 920 as a non-hatched part having a substantially circular shape. Note that the shape of the second marker 920 is not limited in particular, but may be a shape such as a substantially circular shape, a substantially elliptic shape or a substantially polygonal shape.

In the base 930, the first markers 910 and the second markers 920 are each provided with an interval. The first markers 910 and the second markers 920 are provided, for example, in a lattice pattern. Specifically, the six first markers 910 and the ten second markers 920 may be provided in the respective directions orthogonal to each other as illustrated in FIG. 3 to amount to 60. The second markers 920 may be provide outside the first markers 910 to surround the first markers 910. In addition, the first markers 910 may be provided in a rectangular shape. For example, the two first markers 910 may be provided in the respective directions orthogonal to each other to amount to four, and the 56 second markers 920 may be provided in total.

The base 930 has third temperature. The first marker 910 and the second marker 920 are provided to the base 930 as described above. For example, the base 930 may have a substantially rectangular shape. Note that the shape of the base 930 is not limited in particular, but may be a shape such as a substantially circular shape, a substantially elliptic shape or a substantially polygonal shape. The base 930 has, for example, a flat shape.

The first marker 910, the second marker 920, and the base 930 each have different temperature as described above. That makes it possible to distinguish the respective regions showing the first marker 910 and the second marker 920 from other regions in a far-infrared image showing the chart 9 acquired by the far-infrared camera 102 performing imaging, and extract them. Temperature differences between the first marker 910, the second marker 920, and the base 930 are made by a temperature adjustment mechanism H9 that can adjust the temperature of the first marker 910, the second marker 920, and the base 930.

The temperature adjustment mechanism H9 includes a battery 950, a first resistor 941, and a second resistor 942, for example, as illustrated in FIG. 4. Specifically, the first resistor 941 and the second resistor 942 are each connected to the battery 950 in parallel. In addition, the first resistor 941 and the second resistor 942 are respectively provided close to the first marker 910 and the second marker 920. The first resistor 941 and the second resistor 942 are supplied with electric power from the battery 950, thereby using resistance heating to generate heat. That heats the first marker 910 and the second marker 920 respectively positioned in the vicinity of the first resistor 941 and the second resistor 942.

The resistance of the first resistor 941 is lower than that of the second resistor 942. Here, substantially the same voltage is applied to the first resistor 941 and the second resistor 942. Accordingly, as a resistor connected to the battery 950 has lower resistance, the resistor generates more heat. Therefore, the first resistor 941 generates more heat than the second resistor 942. Thus, the first temperature that is the temperature of the first marker 910 is higher than the second temperature that is the temperature of the second marker 920. In addition, there is provided no resistor in the vicinity of the base 930, so that the third temperature that is the temperature of the base 930 is lower than the first temperature and the second temperature.

Note that the temperature adjustment mechanism H9 is not limited to the example described above as long as it can adjust the temperature of the first marker 910, the second marker 920, and the base 930. In addition, the temperature adjustment mechanism H9 may be capable of adjusting the temperature of the first marker 910, the second marker 920 and the base 930 such that the respective detection values of the temperature approximate the first temperature, the second temperature and the third temperature serving as target temperature.

In the chart 9 according to the present embodiment, the relative positions of the plurality of respective second markers 920 in a real space with respect to the plurality of first markers 910 can be decided on the basis of the geometric relationship between the plurality of respective first markers 910. The geometric relationship described above is, in other words, the relative position relationship between the plurality of respective first markers 910. For example, in the chart 9, the relative positions of the plurality of respective second markers 920 in a real space with respect to the plurality of first markers 910 can be decided on the basis of the relative positions of the other respective first markers 910 with respect to the certain first marker 910.

Specifically, the number of the plurality of first markers 910 provided to the base 930 is three or more. That allows vectors indicating the relative positions of the other respective first markers 910 with respect to the certain first marker 910 to be linearly independent from each other. Therefore, positions on a plane including each marker can be expressed with a pair of the above-described vectors that are linearly independent from each other. Accordingly, the relative positions of the plurality of respective second markers 920 in a real space with respect to the plurality of first markers 910 can be expressed with a pair of the above-described vectors that are linearly independent from each other. That makes it possible to precisely decide the relative positions of the plurality of respective second markers 920 in a real space with respect to the plurality of first markers 910 on the basis of the geometric relationship between the plurality of respective first markers 910.

Note that the number and disposition of first markers 910 and second markers 920 in the chart 9 are not limited to the example illustrated in FIG. 3.

FIG. 5 illustrates a chart 9a according to another example different from the example illustrated in FIG. 3. In the chart 9a, as illustrated in FIG. 5, the first markers 910 and the second markers 920 are provided in a lattice pattern. Specifically, the seven first markers 910 and the eleven second markers 920 are provided in the respective directions orthogonal to each other to amount to 77. The second markers 920 are provide outside the first markers 910 to surround the first markers 910. In addition, the first markers 910 may be provided in a cross shape as illustrated in FIG. 5. For example, the three first markers 910 may be provided in the respective directions orthogonal to each other to amount to five, and the 72 second markers 920 may be provided in total.

In addition, FIG. 6 illustrates a chart 9b according to another example different from the examples illustrated in FIGS. 3 and 5. In the chart 9b, as illustrated in FIG. 6, the first markers 910 and the second markers 920 are provided in a lattice pattern. Specifically, the seven first markers 910 and the eleven second markers 920 are provided in the respective directions orthogonal to each other to amount to 77. The second markers 920 are provide outside the first markers 910 to surround the first markers 910. In addition, the first markers 910 may be provided in an L-shape as illustrated in FIG. 6. For example, the two first markers 910 may be provided in the respective directions orthogonal to each other to amount to three, and the 74 second markers 920 may be provided in total.

Note that the first marker 910, the second marker 920, and the base 930 may have different spectral reflection characteristics in a visible light region. That makes it possible, as described below, to distinguish the respective regions showing the first marker 910 and the second marker 920 from other regions in a visible light image showing the chart 9 acquired by the visible light camera performing imaging, and extract them. Therefore, the use of a visible light camera makes it possible to perform calibration between the far-infrared camera 102 and the visible light camera with the same chart 9. The calibration between the far-infrared camera 102 and the visible light camera like this will be described in detail in the following first application example.

In addition, the first marker 910, the second marker 920, and the base 930 may have different spectral reflection characteristics in a near-infrared region. That makes it possible, as described below, to distinguish the respective regions showing the first marker 910 and the second marker 920 from other regions in a near-infrared image showing the chart 9 acquired by the near-infrared camera performing imaging, and extract them. Therefore, the use of a near-infrared camera makes it possible to perform calibration between the far-infrared camera 102 and the near-infrared camera with the same chart 9. The calibration between the far-infrared camera 102 and the near-infrared camera like this will be described in detail in the following second application example.

The image processing device 1 uses, as described above, a far-infrared image showing the chart 9 to calibrate the far-infrared camera 102. Specifically, the image processing device 1 calibrates the far-infrared camera 102 on the basis of the position of each marker in the far-infrared image on the chart 9. In other words, the image processing device 1 decides a camera parameter of the far-infrared camera 102 on the basis of the position of each marker in the far-infrared image on the chart 9. Specifically, the camera parameters include an internal parameter A and an external parameter [R|T].

Here, the overview of the calibration of a camera will be described. First, the relationship between two-dimensional coordinates (x, y) on an image and three-dimensional coordinates (X, Y, Z) in a real space is expressed in accordance with the following expression (1).

[Math. 1]

$$\begin{bmatrix} x \\ y \\ 1 \end{bmatrix} = A[R \mid T] \begin{bmatrix} X \\ Y \\ Z \\ 1 \end{bmatrix} \quad (1)$$

In the expression (1), A is an internal parameter, and represents focal length, an image center and the degree of lens distortion. The internal parameter A is expressed, for example, in accordance with the following expression (2).

[Math. 2]

$$A = \begin{bmatrix} f_x & s & cx \\ 0 & f_y & cy \\ 0 & 0 & 1 \end{bmatrix} \quad (2)$$

In the expression (2), fx and fy are focal length shown in pixel units, cx and cy are image centers, and s is the skew ratio corresponding to the degree of lens distortion.

In addition, in the expression (1), [R|T] is an external parameter, and represents the attitude and position of a camera. The external parameter [R|T] is expressed, for example, in accordance with the following expression (3).

[Math. 3]

$$[R \mid T] = \begin{bmatrix} R_{xx} & R_{xy} & R_{xz} & T_x \\ R_{yx} & R_{yy} & R_{yz} & T_y \\ R_{zx} & R_{zy} & R_{zz} & T_z \end{bmatrix} \quad (3)$$

As shown in the expression (3), R is a 3×3 matrix, and a rotational component showing the attitude of a camera. In addition, T is a 3×1 matrix, and a translational component showing the position of a camera.

Specifically, the calibration system 10 uses the far-infrared camera 102 to perform imaging a plurality of times while causing the attitude and position of the chart 9 to change, and decides the internal parameter A or the external parameter [R|T] on the basis of the position of each marker in each of the acquired far-infrared images. More specifically, the position of each marker in a far-infrared image is substituted into the two-dimensional coordinates (x, y) in the expression (1) for each of a plurality of far-infrared images acquired by performing imaging a plurality of times, which makes it possible to acquire a plurality of equations. The image processing device 1 can decide the internal parameter A or the external parameter [R|T] by solving the plurality of acquired equations as an optimization problem.

In this way, to calibrate the far-infrared camera 102, it is necessary to specify the position of each marker in a far-infrared image. Here, the image processing device 1 according to the present embodiment makes it possible to specify, even in the case where some of the markers are not shown in a far-infrared image showing the chart 9, the position of each marker in the far-infrared image. Accordingly, the calibration precision of the far-infrared camera 102 can be improved. The details of the image processing device 1 like this will be described below.

3. IMAGE PROCESSING DEVICE

Next, the image processing device 1 according to the present embodiment will be described with reference to FIGS. 7 to 17.

[3-1. Hardware Configuration]

First, the hardware configuration of the image processing device 1 according to the present embodiment will be described with reference to FIGS. 7 to 15.

Figure 7:
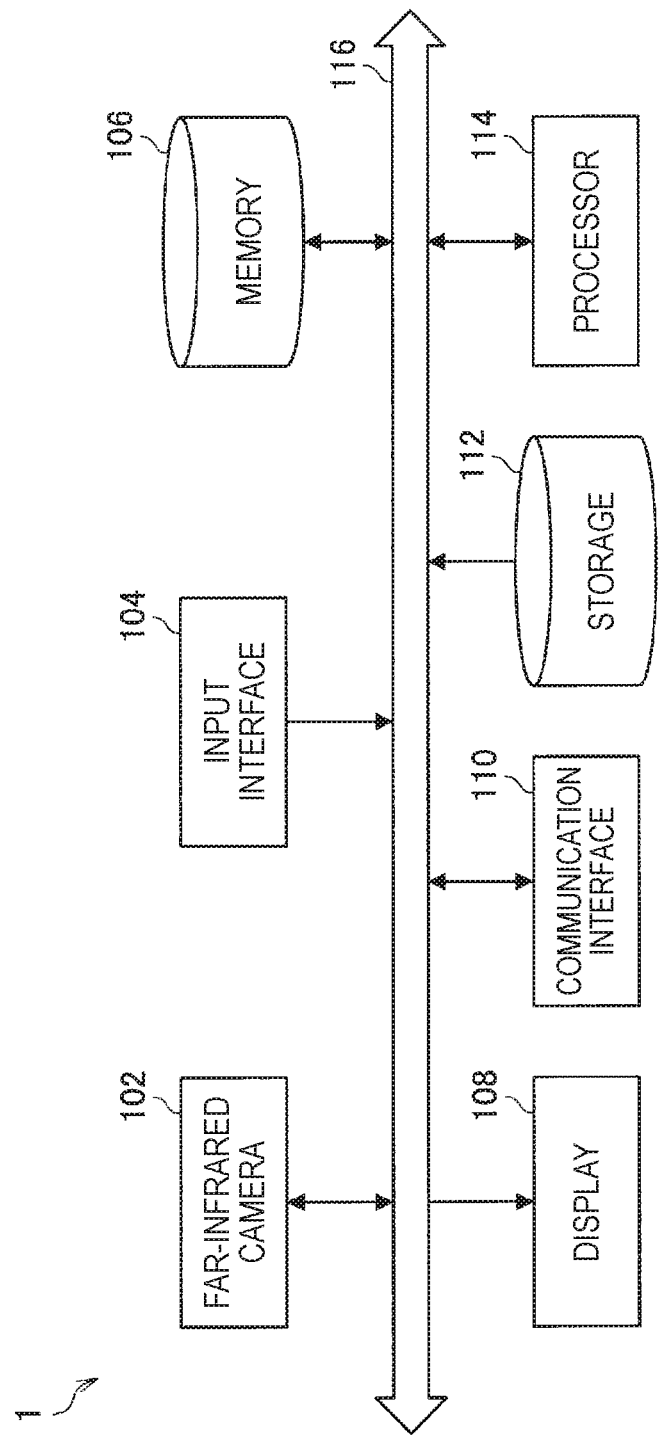
FIG. 7 is a block diagram illustrating an example of a hardware configuration of an image processing device according to the embodiment.

FIG. 7 is a block diagram illustrating an example of the hardware configuration of the image processing device 1 according to the present embodiment. For example, as illustrated in FIG. 7, the image processing device 1 includes a far-infrared camera 102, an input interface 104, a memory 106, a display 108, a communication interface 110, a storage 112, a processor 114, and a bus 116.

(Far-Infrared Camera)

The far-infrared camera 102 is an imaging module that performs imaging by using far-infrared rays, and acquires a far-infrared image. Specifically, the far-infrared camera 102 has an array of imaging elements that sense far-infrared rays with wavelengths belonging to the FIR region. For example, the far-infrared camera 102 captures far-infrared images at given time intervals. In addition, a series of far-infrared images acquired by the far-infrared camera 102 may constitute video.

(Input Interface)

The input interface 104 is used by a user to operate the image processing device 1 or input information to the image processing device 1. For example, the input interface 104 may include an input device such as a touch sensor, a keyboard, a keypad, a button, or a switch. In addition, the input interface 104 may include a sound input microphone and a speech recognition module. In addition, the input interface 104 may include a remote control module that receives a command selected by a user from a remote device.

(Memory)

The memory 106 is a storage medium that can include a random access memory (RAM) and a read only memory (ROM). The memory 106 is coupled to the processor 114, and stores a program and data for a process executed by the processor 114.

(Display)

The display 108 is a display module that has a screen on which an image is displayed. For example, the display 108 may be a liquid crystal display (LCD), an organic light-emitting diode (OLED), a cathode ray tube (CRT), or the like.

(Communication Interface)

The communication interface 110 is a module that mediates communication between the image processing device 1 and another device. The communication interface 110 establishes a communication connection in accordance with any wireless communication protocol or wired communication protocol.

(Storage)

The storage 112 is a storage device that accumulates image data or stores a database used for image processing. The storage 112 contains a storage medium such as a semiconductor memory or a hard disk. Note that a program and data to be described in the present specification may be acquired from an external data source (e.g., a data server, a network storage, an externally attached memory, or the like) of the image processing device 1.

(Processor)

The processor 114 is a processing module such as a central processing unit (CPU) or a digital signal processor (DSP). The processor 114 causes a function to be operated in order to improve the calibration precision of the far-infrared camera 102 by executing a program stored in the memory 106 or another storage medium.

(Bus)

The bus 116 connects the far-infrared camera 102, the input interface 104, the memory 106, the display 108, the communication interface 110, the storage 112, and the processor 114 to each other.

[3-2. Functional Configuration]

Next, the functional configuration of the image processing device 1 according to the present embodiment will be described with reference to FIG. 8.

Figure 8:
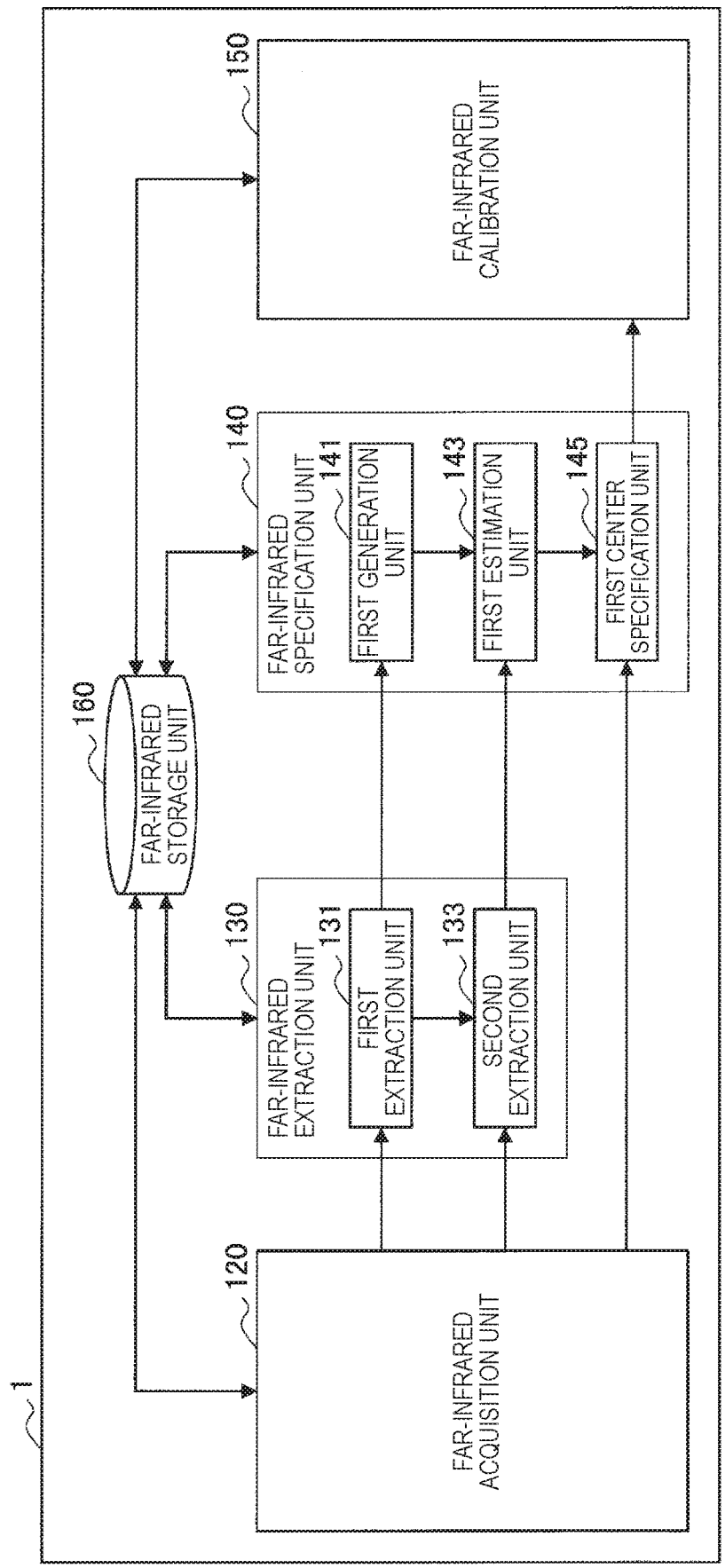
FIG. 8 is a block diagram illustrating an example of a functional configuration of the image processing device according to the embodiment.

FIG. 8 is a block diagram illustrating an example of a functional configuration realized by mutual cooperation between components of the image processing device 1 illustrated in FIG. 7. The image processing device 1 includes a far-infrared acquisition unit 120, a far-infrared extraction unit 130, a far-infrared specification unit 140, a far-infrared calibration unit 150, and a far-infrared storage unit 160, for example, as illustrated in FIG. 8.

(Far-Infrared Storage Unit)

The far-infrared storage unit 160 stores data that is referred to in each process performed by the image processing device 1. For example, the far-infrared storage unit 160 stores information indicating thresholds used in the respective binarizing processes performed by a first extraction unit 131 and a second extraction unit 133. In addition, the far-infrared storage unit 160 may also store a process result acquired according to each process performed by each functional unit. Each functional unit can acquire a process result of each process from the far-infrared storage unit 160. In addition, the far-infrared storage unit 160 may store a far-infrared image captured by the far-infrared camera 102. Each functional unit can acquire a far-infrared image captured by the far-infrared camera 102 from the far-infrared storage unit 160.

(Far-Infrared Acquisition Unit)

The far-infrared acquisition unit 120 acquires a far-infrared image. Specifically, the far-infrared acquisition unit 120 acquires a far-infrared image captured by the far-infrared camera 102 and showing the chart 9. In addition, the far-infrared acquisition unit 120 outputs the acquired far-infrared image to the far-infrared extraction unit 130 and the far-infrared specification unit 140. For example, the far-infrared acquisition unit 120 may directly acquire a far-infrared image from the far-infrared camera 102. In addition, the far-infrared acquisition unit 120 may be the far-infrared camera 102 itself. In addition, the far-infrared acquisition unit 120 may acquire a far-infrared image stored in the far-infrared storage unit 160. A far-infrared image acquired by the far-infrared acquisition unit 120 may be an image subjected to a preliminary process such as amplifying a signal and removing noise.

Figure 9:
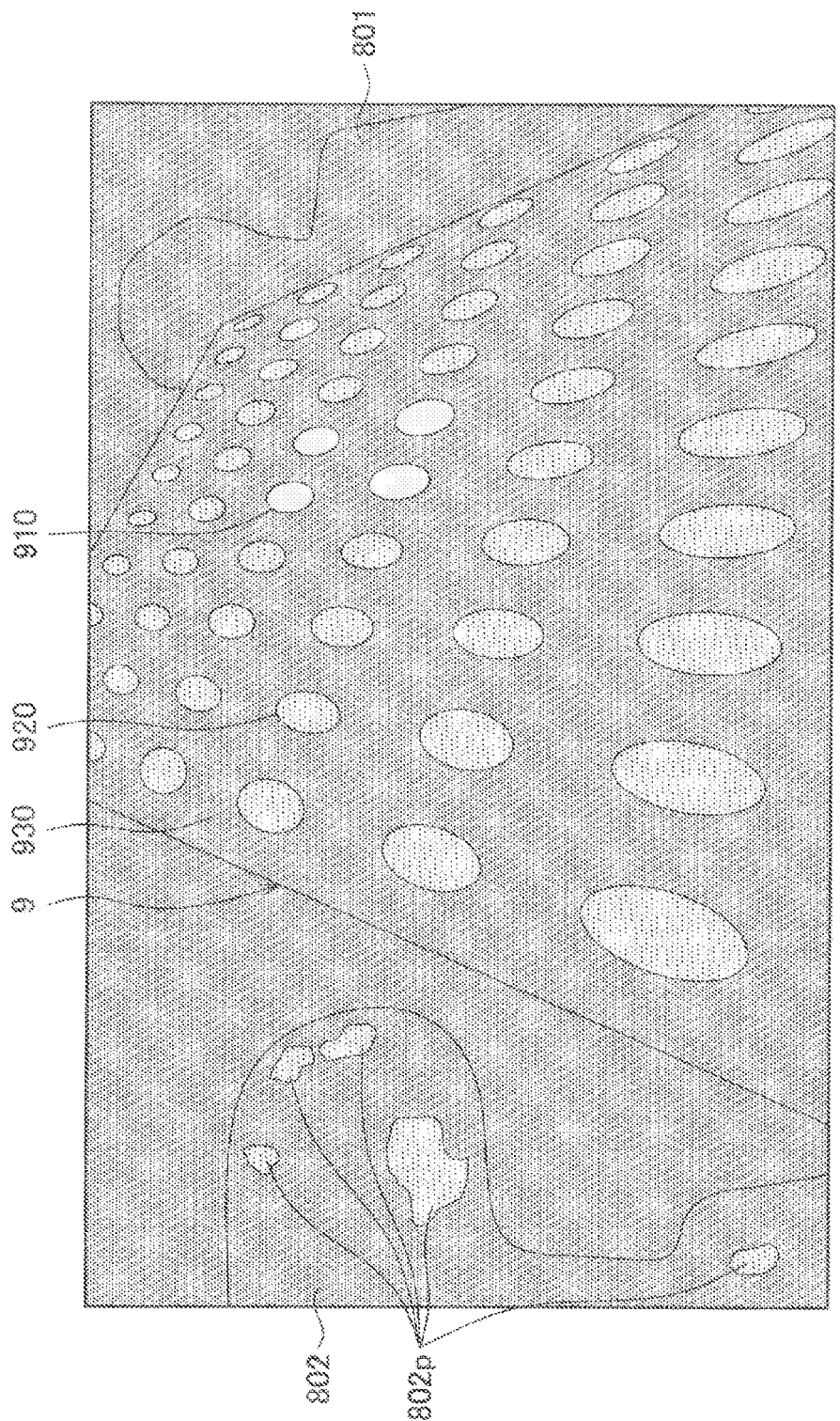
FIG. 9 is an explanatory diagram illustrating an example of a far-infrared image acquired by a far-infrared acquisition unit.

FIG. 9 is an explanatory diagram illustrating an example of a far-infrared image acquired by the far-infrared acquisition unit 120. As illustrated in FIG. 9, the far-infrared image shows the chart 9. The far-infrared image does not show some of the second markers 920 while showing all of the first markers 910. In addition, the far-infrared image shows a person 801 and an object 802 as the background of the chart 9. Here, in the images illustrated in FIGS. 9 to 15, light and shade of hatching indicate whether pixel values are different or the same. A segment with the deeper hatching is a segment with lower pixel values.

(Far-Infrared Extraction Unit)

The far-infrared extraction unit 130 distinguishes a region showing a specific object from other regions, and extracts it from a far-infrared image acquired by the far-infrared acquisition unit 120. In addition, the far-infrared extraction unit 130 outputs an extraction result to the far-infrared specification unit 140. The far-infrared extraction unit 130 includes a first extraction unit 131 and a second extraction unit 133, for example, as illustrated in FIG. 8.

The first extraction unit 131 extracts the plurality of first markers 910 having the first temperature from a far-infrared image. Specifically, the first extraction unit 131 extracts the plurality of first markers 910 from a far-infrared image acquired by the far-infrared acquisition unit 120, and outputs an extraction result to the far-infrared specification unit 140. The first extraction unit 131 performs a binarizing process, for example, on a far-infrared image, thereby extracting the plurality of first markers 910. Specifically, the first extraction unit 131 allocates a first pixel value that is a relatively low value to a pixel having a pixel value lower than a first threshold in a far-infrared image, and allocates a second pixel value that is a relatively high value to a pixel having a pixel value higher than or equal to the first threshold in a far-infrared image. Here, the first threshold is set at a pixel value corresponding to temperature lower than the first temperature of the first marker 910, and higher than the second temperature of the second marker 920. That allocates the second pixel value to a region showing each first marker 910, thereby allowing the plurality of first markers 910 to be extracted.

Figure 10:
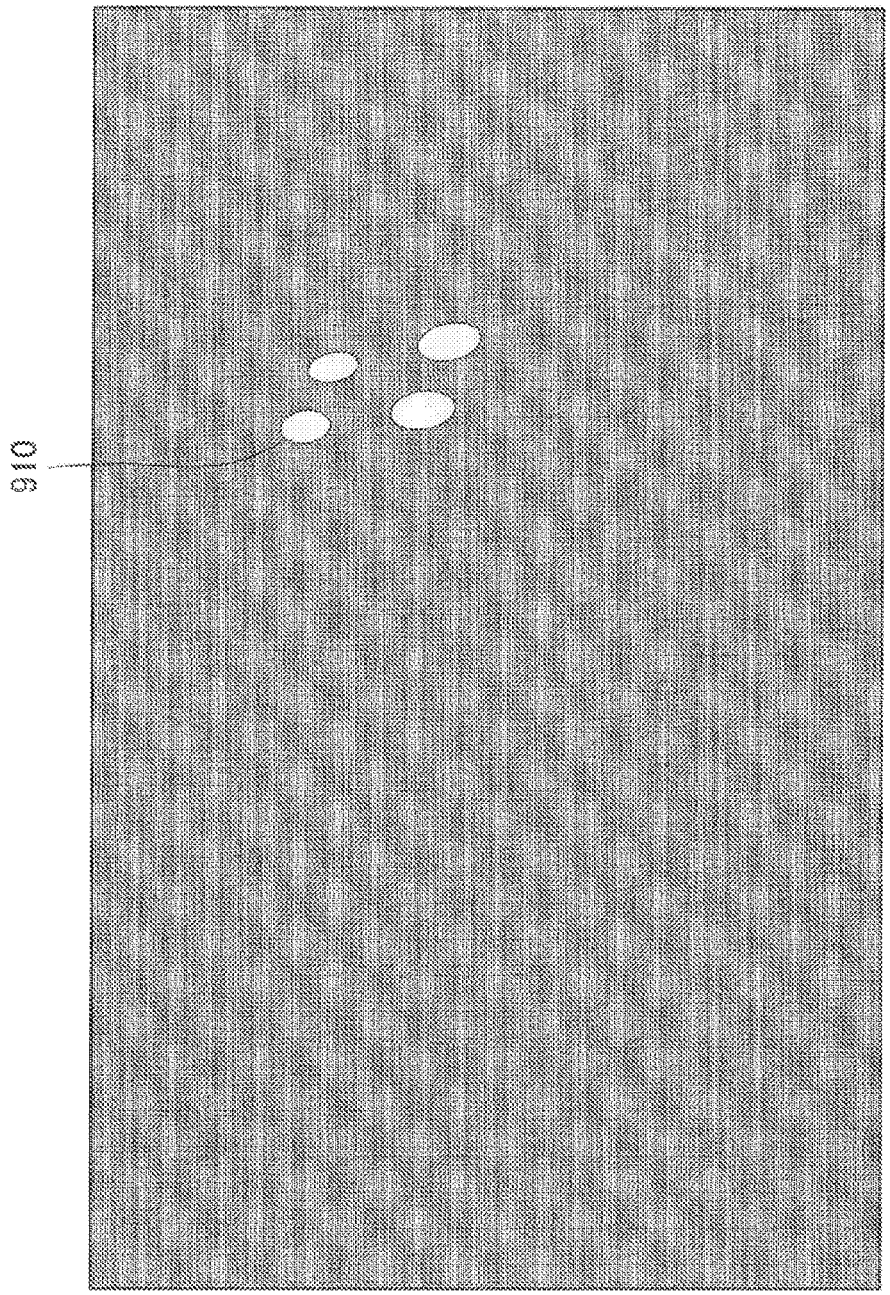
FIG. 10 is an explanatory diagram illustrating an example of a binarized image acquired in a process of extracting a first marker.

FIG. 10 is an explanatory diagram illustrating an example of a binarized image acquired in a process of extracting the first marker 910. The first extraction unit 131 performs a binarizing process, for example, on the far-infrared image illustrated in FIG. 9. As illustrated in FIG. 9, in the far-infrared image, regions other than a region showing the first marker 910 have a pixel value corresponding to temperature lower than or equal to the second temperature. Therefore, the respective pixels of the regions other than the region showing the first marker 910 have a pixel value lower than the first threshold, so that the first extraction unit 131 allocates the first pixel value that is a relatively low value to the respective pixels of the regions. Meanwhile, the respective pixels of the region showing the first marker 910 have a pixel value higher than or equal to the first threshold, so that the first extraction unit 131 allocates the second pixel value that is a relatively high value to the respective pixels of the region. That causes the plurality of first markers 910 to be extracted, and causes the binarized image illustrated in FIG. 10 to be output as an extraction result.

The second extraction unit 133 extracts a second marker candidate that is a candidate for each of the plurality of second markers 920 from a far-infrared image. Specifically, the second extraction unit 133 extracts the second marker candidate from a far-infrared image acquired by the far-infrared acquisition unit 120, and outputs an extraction result to the far-infrared specification unit 140. The second extraction unit 133 performs a binarizing process, for example, on a far-infrared image, thereby extracting a second marker candidate. Specifically, the second extraction unit 133 allocates a first pixel value that is a relatively low value to a pixel having a pixel value lower than a second threshold in a far-infrared image, and allocates a second pixel value that is a relatively high value to a pixel having a pixel value higher than or equal to the second threshold in a far-infrared image. Here, the second threshold is set at a pixel value corresponding to temperature lower than the second temperature of the second marker 920, and higher than the third temperature of the base 930. That causes the second pixel value to be allocated to at least a region showing the second marker 920 in the far-infrared image, thereby allowing the second marker candidate to be extracted.

Figure 11:
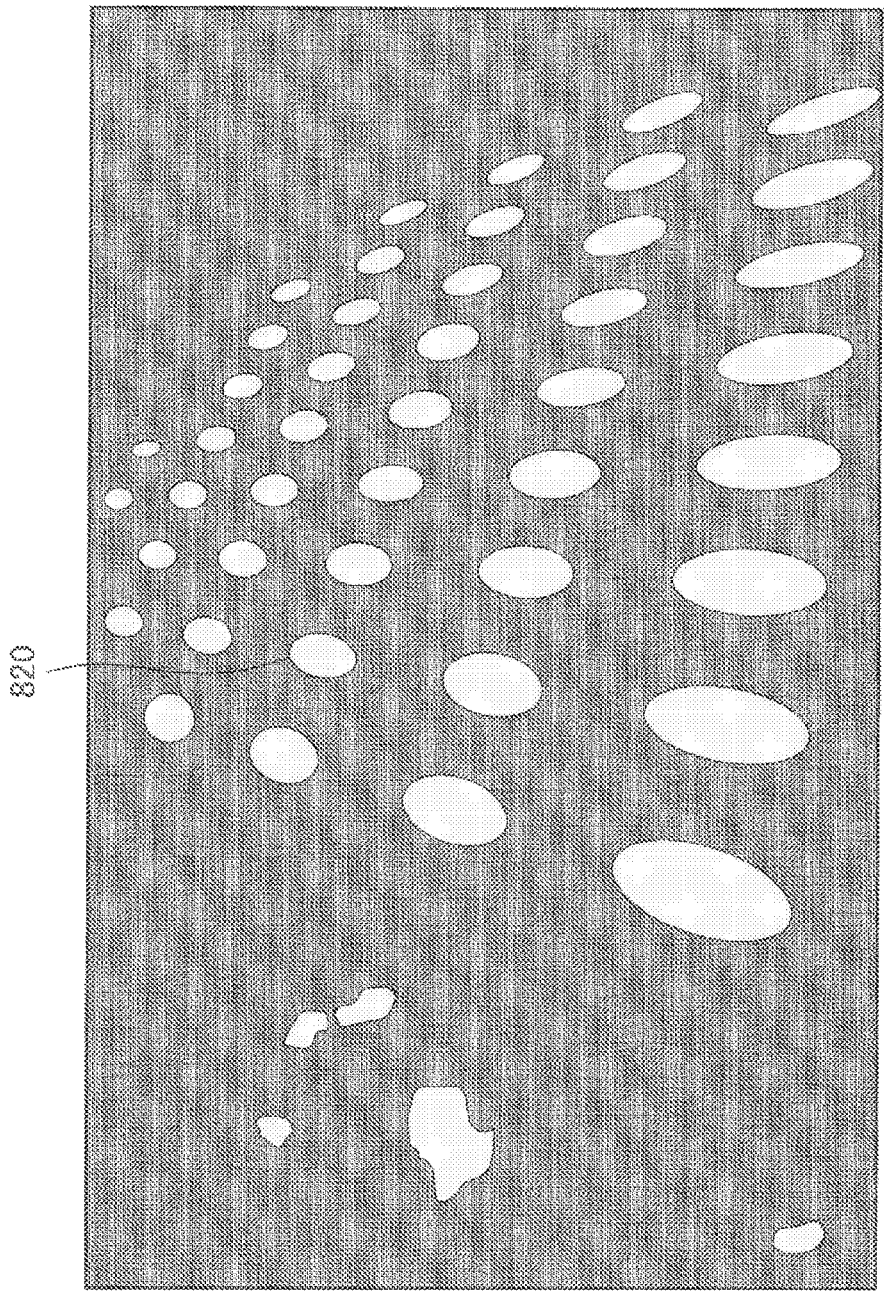
FIG. 11 is an explanatory diagram illustrating an example of a binarized image acquired in a process of extracting a second marker candidate.

FIG. 11 is an explanatory diagram illustrating an example of a binarized image acquired in a process of extracting the second marker candidate 820. The second extraction unit 133 performs a binarizing process, for example, on the far-infrared image illustrated in FIG. 9. As illustrated in FIG. 9, in the far-infrared image, regions other than regions showing high-temperature parts 802p of the first marker 910, the second marker 920 and the object 802 have a pixel value corresponding to temperature lower than or equal to the third temperature. Therefore, the respective pixels of the regions other than the regions showing the high-temperature parts 802p of the first marker 910, the second marker 920 and the object 802 have a pixel value lower than the second threshold, so that the second extraction unit 133 allocates the first pixel value that is a relatively low value to the respective pixels of the regions. Meanwhile, the respective pixels of the regions showing the high-temperature parts 802p of the first marker 910, the second marker 920 and the object 802 have a pixel value higher than or equal to the second threshold, so that the second extraction unit 133 allocates the second pixel value that is a relatively high value to the respective pixels of the regions. That causes the second marker candidate 820 to be extracted, and causes the binarized image illustrated in FIG. 11 to be output as an extraction result.

(Far-Infrared Specification Unit)

The far-infrared specification unit 140 specifies the position of each marker in a far-infrared image. In addition, the far-infrared specification unit 140 outputs information indicating the specified position of each marker in a far-infrared image to the far-infrared calibration unit 150. In the present embodiment, the far-infrared specification unit 140 specifies the position of each of the plurality of second markers 920 in a far-infrared image on the basis of the geometric relationship between the plurality of respective first markers 910. The far-infrared specification unit 140 includes a first generation unit 141, a first estimation unit 143, and a first center specification unit 145, for example, as illustrated in FIG. 8. Note that the first generation unit 141, the first estimation unit 143, and the first center specification unit 145 respectively correspond to a generation unit, an estimation unit, and a center specification unit according to the present disclosure.

The first generation unit 141 generates candidate information on the basis of the geometric relationship between the plurality of respective first markers 910. The candidate information is information indicating a candidate for the position of the second marker 920 in a far-infrared image. In addition, the first generation unit 141 outputs the generated candidate information to the first estimation unit 143.

Figure 12:
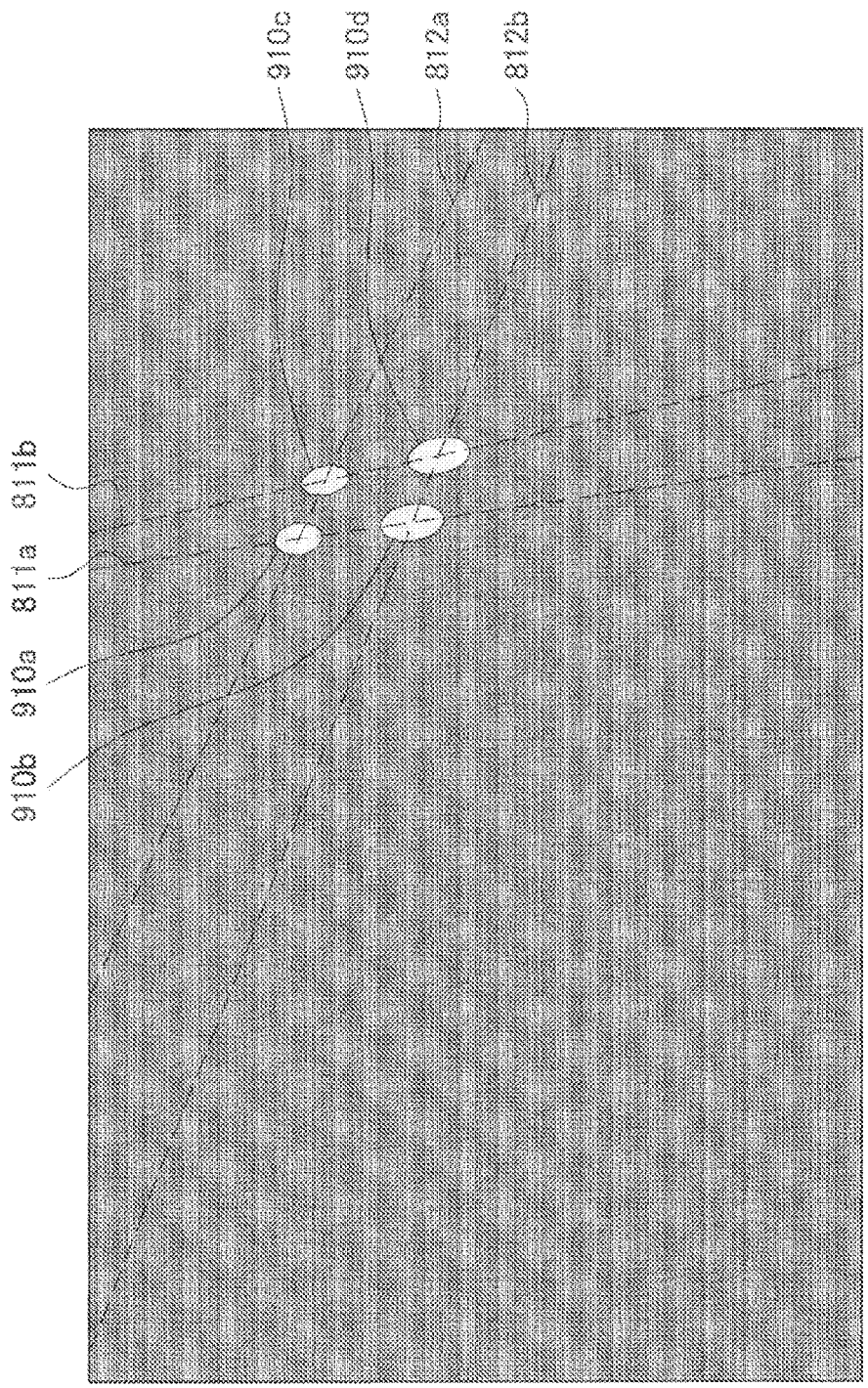
FIG. 12 is an explanatory diagram illustrating an example of candidate information to be generated.

FIG. 12 is an explanatory diagram illustrating an example of generated candidate information. The first generation unit 141 uses, for example, the binarized image illustrated in FIG. 10 to generate candidate information. The first generation unit 141 may generate a straight line in a far-infrared image which corresponds to a straight line passing through the second marker 920 in a real space as candidate information. Specifically, the first generation unit 141 generates a straight line in a far-infrared image which passes through the first markers 910 adjacent to each other as candidate information. Here, in the chart 9a, as described above, the first markers 910 and the second markers 920 are provided in a lattice pattern. Therefore, in a real space, the second marker 920 is positioned on a straight line passing through the first markers 910 adjacent to each other. Accordingly, in a far-infrared image, the second marker 920 can be positioned on a straight line generated by the first generation unit 141.

Specifically, the first generation unit 141 generates a straight line 811a in a far-infrared image which passes through the first markers 910a and 910b adjacent to each other as candidate information. In addition, the first generation unit 141 generates a straight line 811b in a far-infrared image which passes through the first markers 910c and 910d adjacent to each other as candidate information. In addition, the first generation unit 141 generates a straight line 812a in a far-infrared image which passes through the first markers 910a and 910c adjacent to each other as candidate information. In addition, the first generation unit 141 generates a straight line 812b in a far-infrared image which passes through the first markers 910b and 910d adjacent to each other as candidate information. The straight line 811a and the straight line 811b are parallel to each other in a real space, and the straight line 811c and the straight line 811d are parallel to each other in a real space. In addition, the straight line 811a and the straight line 811b, and a straight line 812c and a straight line 812d are orthogonal to each other in a real space.

Note that the candidate information generated by the first generation unit 141 is not limited to the example illustrated in FIG. 12. For example, the first generation unit 141 generates a straight line in a far-infrared image which passes through the first markers 910a and 910d provided in the directions diagonal to each other as candidate information. In addition, the candidate information does not also have to be a straight line, but may be a region having width.

The first estimation unit 143 estimates the relationship between the second marker candidate 820 extracted by the second extraction unit 133 and each of the plurality of second markers 920 on the basis of the geometric relationship between the plurality of respective first markers 910. In other words, the first estimation unit 143 estimates which of the second markers 920 the second marker candidate 820 is on the basis of the geometric relationship between the plurality of respective first markers 910. In addition, the first estimation unit 143 outputs information indicating the estimated relationship described above to the first center specification unit 145.

In this way, estimating the relationship described above on the basis of the geometric relationship between the plurality of respective first markers 910 makes it possible to precisely estimate the relationship described above. That allows the position of each of the plurality of second markers 920 in a far-infrared image to be precisely specified.

Specifically, the first estimation unit 143 estimates the relationship described above on the basis of candidate information generated by the first generation unit 141. More specifically, the first estimation unit 143 determines, on the basis of the candidate information, whether or not each of the second marker candidates 820 corresponds to any of the second markers 920. Then, the first estimation unit 143 estimates, on the basis of the candidate information, the relationship between the second marker candidate 820 determined to correspond to any of the second markers 920 and each of the plurality of second markers 920.

Figure 13:
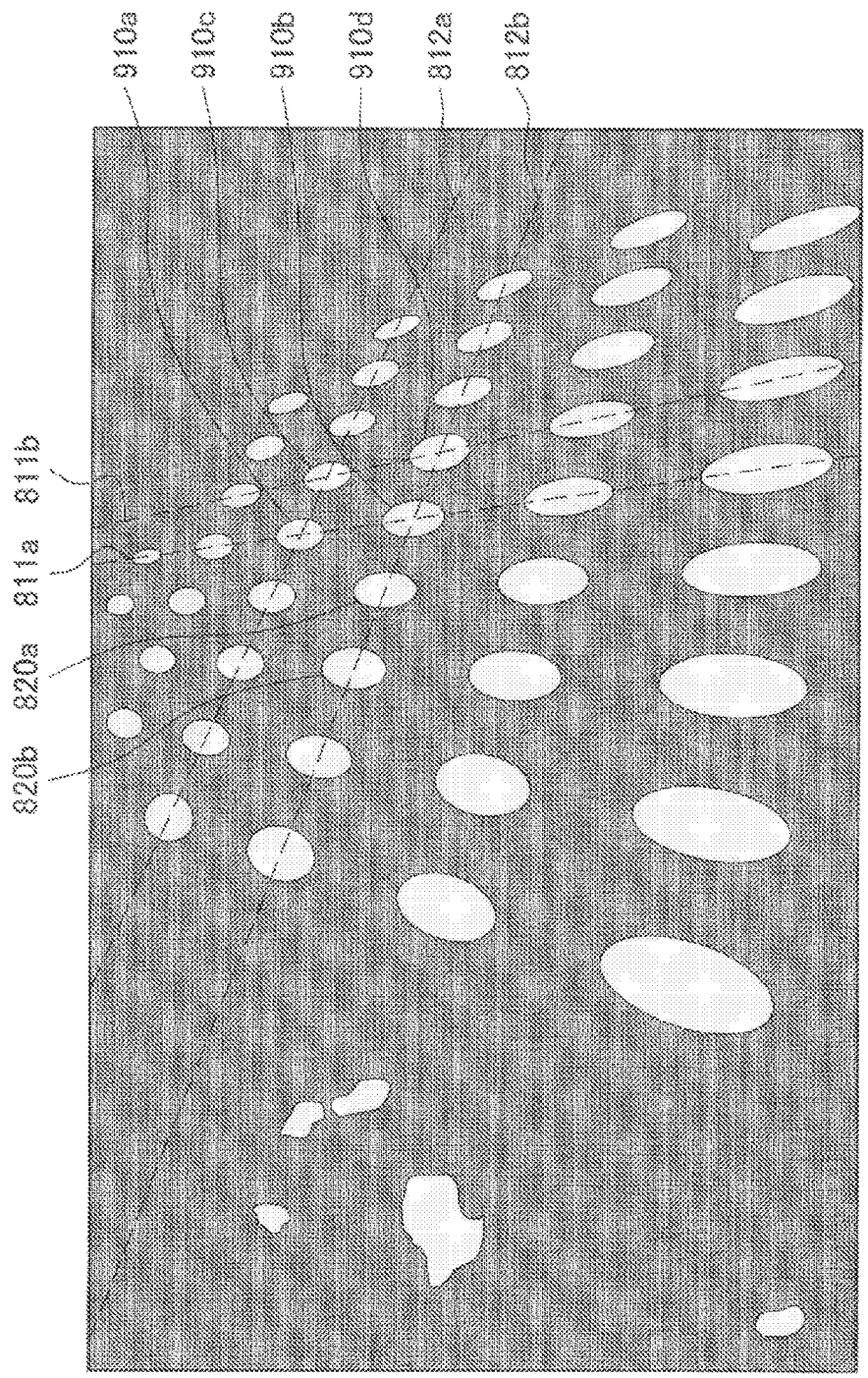
FIG. 13 is an explanatory diagram for describing a process of estimating a relationship between the second marker candidate and each of a plurality of second markers.
Figure 14:
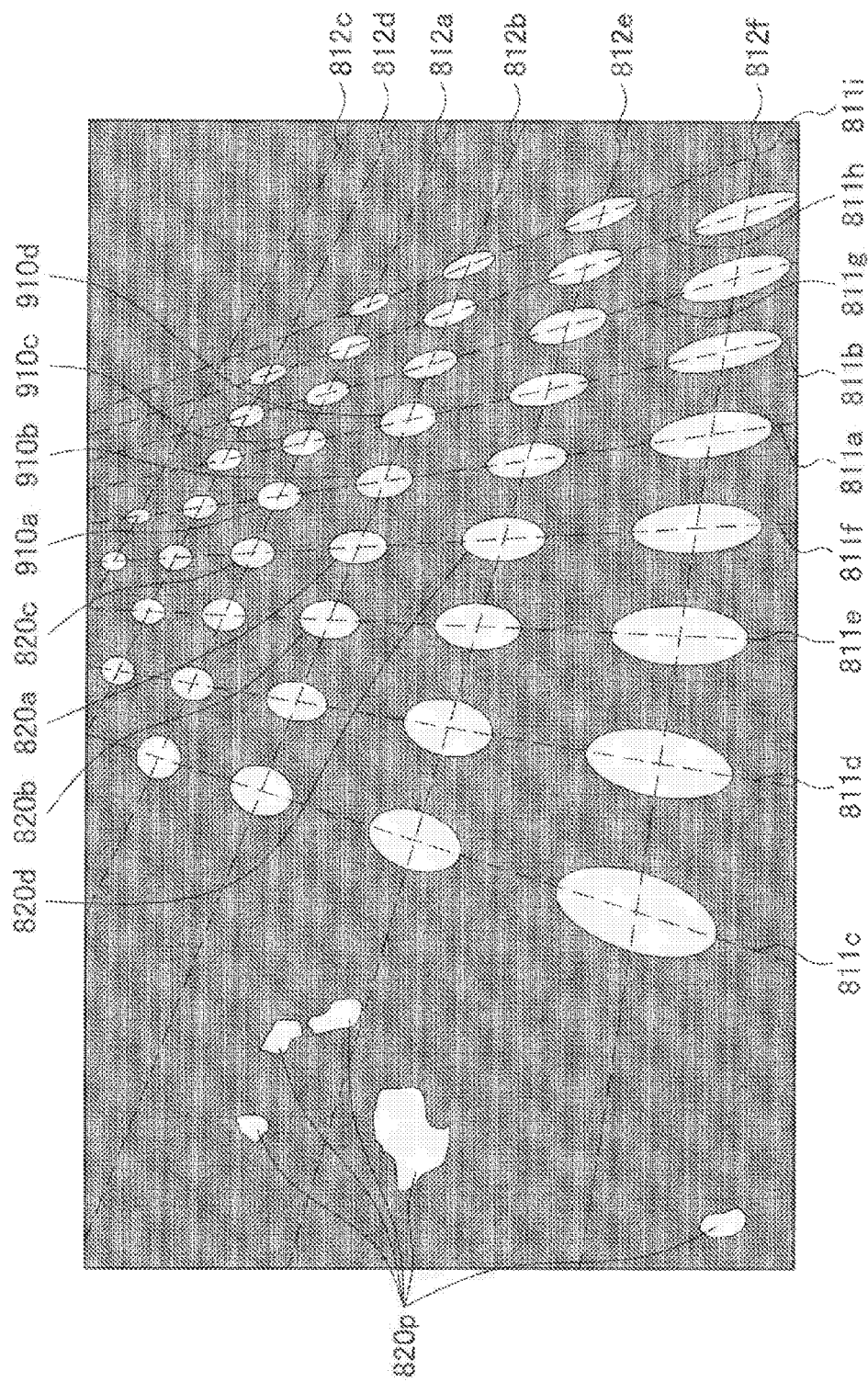
FIG. 14 is an explanatory diagram for describing the process of estimating the relationship between the second marker candidate and each of the plurality of second markers.

FIGS. 13 and 14 are explanatory diagrams for describing a process of estimating the relationship between the second marker candidate 820 and each of the plurality of second markers 920. The first estimation unit 143 uses, for example, the binarized image illustrated in FIG. 11 to estimate the relationship described above.

The first estimation unit 143 determines, for example, as illustrated in FIG. 13, that the second marker candidates 820 positioned on the respective straight lines of the straight lines 811a, 811b, 812a and 812b generated by the first generation unit 141 in the binarized image illustrated in FIG. 11 correspond to any of the second markers 920. Here, the first estimation unit 143 may also determine that the second marker candidate 820 corresponding to the first marker 910 extracted by the first extraction unit 131 does not correspond to any of the second markers 920. The first estimation unit 143 can determine, for example, on the basis of information indicating the respective positions and dimension of the second marker candidates 820 and the first markers 910 in a far-infrared image, whether or not each second marker candidate 820 corresponds to any of the first markers 910.

Then, the first estimation unit 143 estimates, for example, the relationship between the second marker candidate 820 positioned on each straight line generated by the first generation unit 141 and each of the plurality of second markers 920 on the basis of the positional relationship between the straight line on which the second marker candidate 820 is positioned and the plurality of first markers 910 on the straight line. For example, the first estimation unit 143 estimates that a second marker candidate 820a adjacent to the first marker 910b on the straight line 812b is the second marker 920 adjacent to the first marker 910b on the opposite side of the first marker 910d in a real space. In addition, the first estimation unit 143 estimates that the second marker candidate 820b adjacent to the second marker candidate 820a on the straight line 812b is the second marker 920 adjacent to the second marker 920 corresponding to the second marker candidate 820a on the opposite side of the first marker 910b in a real space.

In addition, the first estimation unit 143 generates, for example, a straight line passing through the second marker candidates 820 adjacent to each other which are determined to correspond to any of the second markers 920 as additional candidate information. In the chart 9a, as described above, the first markers 910 and the second markers 920 are provided in a lattice pattern. Therefore, in a real space, the other second marker 920 is positioned on a straight line passing through the second markers 920 adjacent to each other. Accordingly, in a far-infrared image, the second marker 920 can be positioned on a straight line additionally generated by the first estimation unit 143. For example, the first estimation unit 143 additionally generates, as illustrated in FIG. 14, the straight lines 811c to 811i passing through the second marker candidate 820 on the straight line 812a and the second marker candidate 820 on the straight line 812b which is adjacent to the second marker candidate 820. In addition, the first estimation unit 143 additionally generates the straight lines 812c to 812f passing through the second marker candidate 820 on the straight line 811a and the second marker candidate 820 on the straight line 811b which is adjacent to the second marker candidate 820.

In addition, the first estimation unit 143 determines, for example, that the second marker candidate 820 positioned on each of the additionally generated straight lines corresponds to any of the second markers 920. Then, the first estimation unit 143 estimates, for example, the relationship between the second marker candidate 820 positioned on each straight line that is additionally generated and each of the plurality of second markers 920 on the basis of the positional relationship between the straight line on which the second marker candidate 820 is positioned and the other second marker candidate 820 on the straight line. For example, as illustrated in FIG. 14, the case will be considered where a second marker candidate 820d is positioned on the straight line 811f passing through the second marker candidate 820a adjacent to the first marker 910b and a second marker candidate 820c to adjacent to the first marker 910a, and adjacent to the second marker candidate 820a on the opposite side of the second marker candidate 820c. In this case, the first estimation unit 143 estimates that the second marker candidate 820d is the second marker 920 adjacent to the second marker 920 corresponding to the second marker candidate 820a on the opposite side of the second marker 920 corresponding to the second marker candidate 820c in a real space.

In this way, the first estimation unit 143 estimates which of the second markers 920 the second marker candidate 820 determined to correspond to any of the second markers 920 is. Note that the first estimation unit 143 may also determine that the second marker candidate 820 not positioned on each straight line generated by the first generation unit 141 or the first estimation unit 143 does not correspond to any of the second markers 920. For example, as illustrated in FIG. 14, a second marker candidate 820p corresponding to the high-temperature part 802p of the object 802 illustrated in FIG. 9 is not positioned on any straight lines of the straight lines 811a to 811i and the straight lines 812a to 812f. In such a case, the first estimation unit 143 may determine that the second marker candidate 820p does not correspond to any of the second markers 920. In addition, the first estimation unit 143 may determine, on the basis of the geometric relationship between the respective extracted second marker candidates 820, that the second marker candidate 820p does not correspond to any of the second markers 920. Specifically, in the case where the positional relationship of the second marker candidate 820p with the other second marker candidates 820 does not correspond to the relationship that can be assumed as the positional relationship of each second marker 920 with the other second markers 920 in a far-infrared image, the first estimation unit 143 may determine that the second marker candidate 820p does not correspond to any of the second markers 920. In addition, the first estimation unit 143 may determine, on the basis of the dimension or shape of the second marker candidate 820p, that the second marker candidate 820p does not correspond to any of the second markers 920.

The first center specification unit 145 specifies the central position of the second marker candidate 820 as the position of the second marker 920 in a far-infrared image which is associated according to the relationship estimated by the first estimation unit 143. In addition, the first center specification unit 145 specifies the central position of the first marker 910 extracted by the first extraction unit 131 as the position of the first marker 910 in a far-infrared image. The first center specification unit 145 outputs information indicating the specified position of each marker in a far-infrared image to the far-infrared calibration unit 150.

In this way, specifying the central position of the second marker candidate 820 as the position of the second marker 920 in a far-infrared image which is associated according to the relationship estimated by the first estimation unit 143 allows the position of each of the plurality of second markers 920 in the far-infrared image to be more precisely specified. In addition, specifying the central position of the first marker 910 extracted by the first extraction unit 131 as the position of the first marker 910 in a far-infrared image allows the position of each of the plurality of first markers 910 in the far-infrared image to be more precisely specified.

Figure 15:
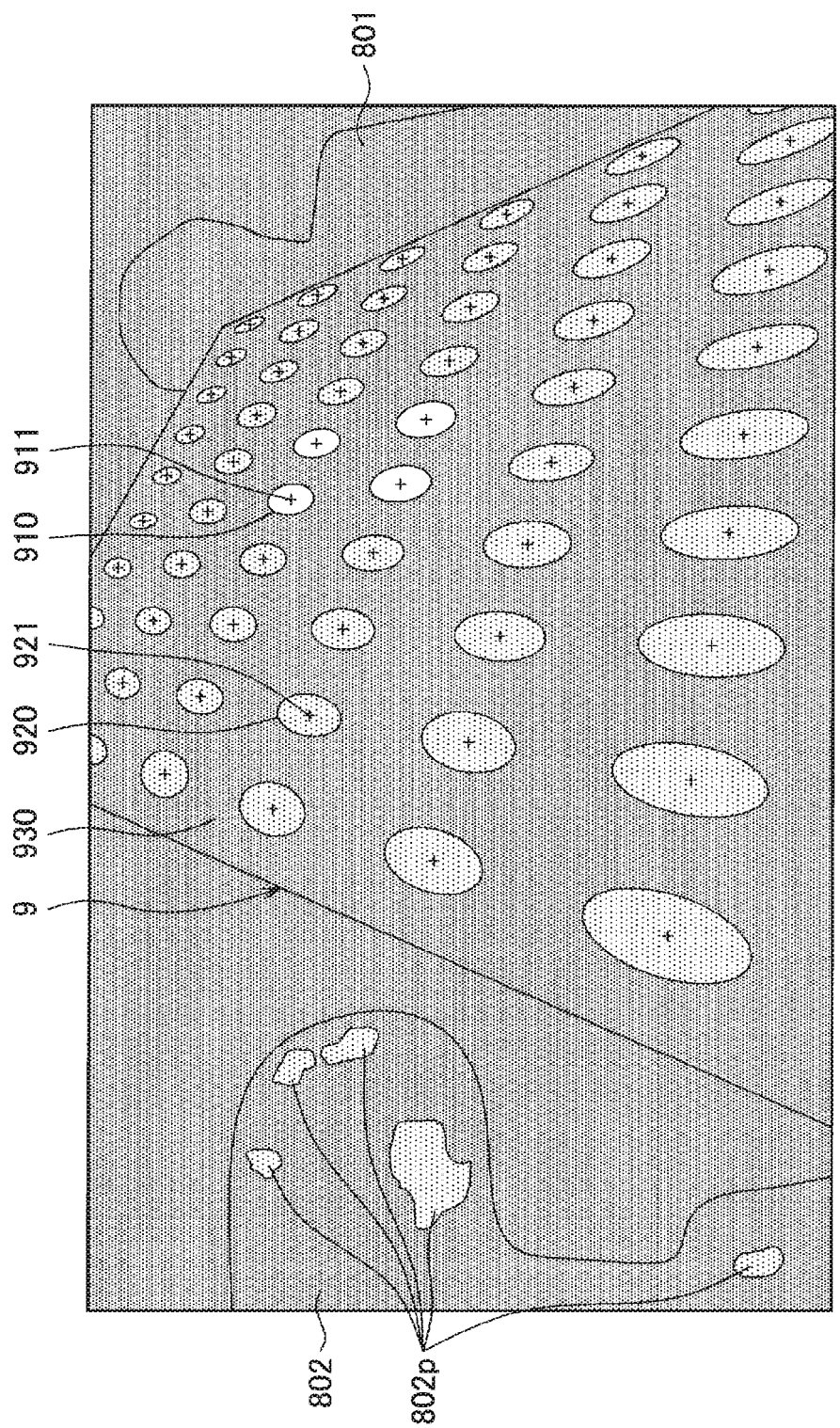
FIG. 15 is an explanatory diagram for describing a center specification process.

FIG. 15 is an explanatory diagram for describing a center specification process. The first center specification unit 145 uses, for example, the far-infrared image illustrated in FIG. 9 to specify the central position of each marker. Specifically, the first center specification unit 145 specifies the position of a center 921 of a region showing the second marker 920 corresponding to the second marker candidate 820 determined to correspond to any of the second markers 920 in a far-infrared image as the position of the second marker 920 in the far-infrared image. The first center specification unit 145 performs image processing such as ellipse fitting on the region, and can hereby specify the position of the center 921 of the region. In addition, the first center specification unit 145 specifies the position of the center 911 of a region showing the extracted first marker 910 in a far-infrared image as the position of the first marker 910 in the far-infrared image. The first center specification unit 145 performs image processing such as ellipse fitting on the region, and can hereby specify the position of the center 911 of the region.

Note that the first center specification unit 145 may also use the binarized images illustrated in FIGS. 10 and 11 to specify the central position of each marker. Specifically, the first center specification unit 145 may specify the position of the center of a region showing the second marker candidate 820 in a binarized image output by the second extraction unit 133 as the position of the second marker 920 in a far-infrared image which is associated according to the relationship estimated by the first estimation unit 143. In addition, the first center specification unit 145 may specify the position of the center of a region showing the first marker 910 in a binarized image output by the first extraction unit 131 as the position of the first marker 910 in a far-infrared image.

(Far-Infrared Calibration Unit)

The far-infrared calibration unit 150 calibrates, on the basis of the position of each marker in a far-infrared image, the far-infrared camera 102 that captures the far-infrared image. Specifically, the far-infrared calibration unit 150 calibrates the far-infrared camera 102 on the position of each of the plurality of second markers 920 in a far-infrared image. More specifically, the far-infrared calibration unit 150 calibrates the far-infrared camera 102 on the basis of the respective positions of both each of the plurality of first markers 910 and each of the plurality of second markers 920 in a far-infrared image.

Specifically, the far-infrared calibration unit 150 substitutes, as described above, the position of each marker in a far-infrared image into the two-dimensional coordinates (x, y) in the expression (1), and solves the plurality of acquired equations as optimization problems, thereby deciding a camera parameter of the far-infrared camera 102. Specifically, the far-infrared calibration unit 150 decides the internal parameter A of the far-infrared camera 102 on the basis of the position of each marker in a far-infrared image.

The far-infrared calibration unit 150 outputs information indicating the decided camera parameter of far-infrared camera 102 to the external device. The external device into which the information indicating the camera parameter of the far-infrared camera 102 is input performs various kinds of image processing on the basis of the information. For example, the external device can perform a process of reducing camera distortion in an acquired far-infrared image on the basis of the information. Note that the far-infrared calibration unit 150 may cause the information indicating the decided camera parameter of the far-infrared camera 102 to be stored in the far-infrared storage unit 160.

According to the image processing device 1 according to the present embodiment as described above, the far-infrared specification unit 140 specifies the position of each of the plurality of respective second markers 920 in a far-infrared image on the basis of the geometric relationship between the plurality of respective first markers 910. Even in the case where a far-infrared image showing the chart 9 does not show some of the second markers 920, that makes it possible to specify the position of each marker in the far-infrared image. Therefore, it is also possible for a far-infrared image showing markers at the ends to specify the position of each marker in the far-infrared image. It is thus possible to sufficiently secure information used to calibrate the far-infrared camera 102. Accordingly, the calibration precision of the far-infrared camera 102 can be improved.

In addition, the image processing device 1 according to the present embodiment calibrates the far-infrared camera 102, as described above, on the basis of the position of each of the plurality of second markers 920 which is specified by the far-infrared specification unit 140 in a far-infrared image. That achieves precise calibration as the calibration of the far-infrared camera 102.

In addition, according to the chart 9 according to the present embodiment, the relative positions of the plurality of respective second markers 920 in a real space with respect to the plurality of first markers 910 can be decided on the basis of the geometric relationship between the plurality of respective first markers 910. That makes it possible to specify the position of each of the plurality of second markers 920 in a far-infrared image on the basis of the geometric relationship between the plurality of respective first markers 910. Therefore, even in the case where a far-infrared image showing the chart 9 does not some of the second markers 920, it is possible to specify the position of each marker in the far-infrared image. Accordingly, the calibration precision of the far-infrared camera 102 can be improved.

[3-3. Operation]

Next, the flow of a process performed by the image processing device 1 according to the present embodiment will be described with reference to FIGS. 16 and 17.

Figure 16:
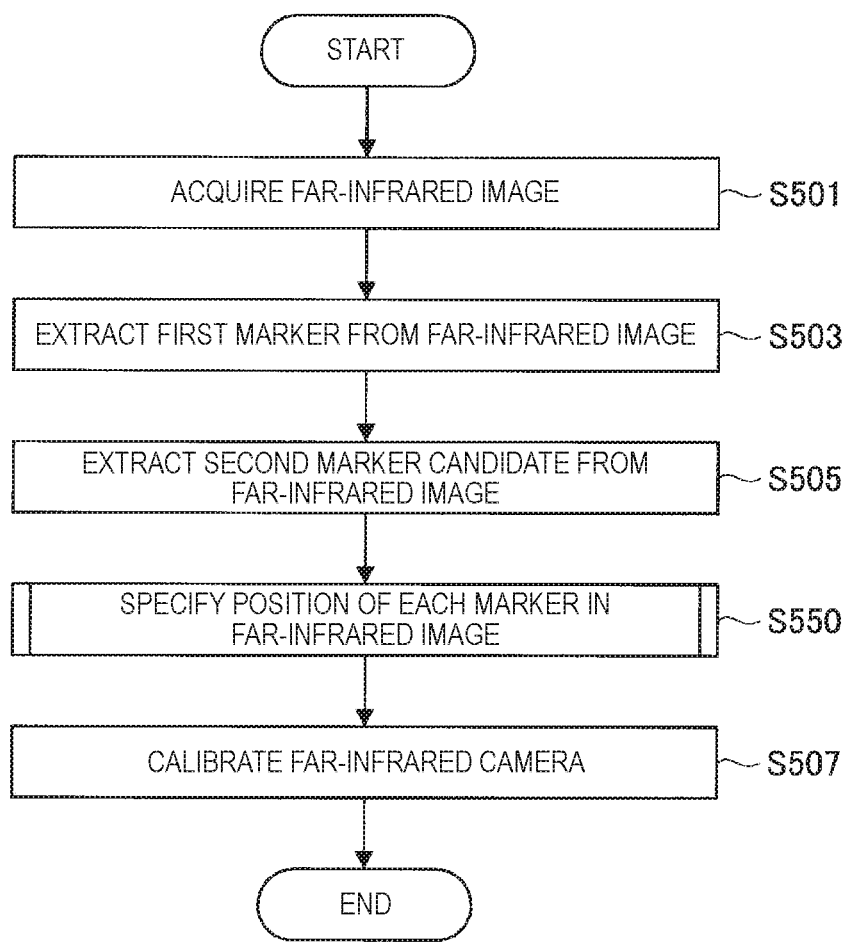
FIG. 16 is a flowchart illustrating an example of a flow of a process performed by the image processing device according to the embodiment.

FIG. 16 is a flowchart illustrating an example of the flow of the process performed by the image processing device 1 according to the present embodiment.

As illustrated in FIG. 16, first, the far-infrared acquisition unit 120 acquires a far-infrared image showing the chart 9 (step S501), and outputs the acquired far-infrared image to the far-infrared extraction unit 130 and the far-infrared specification unit 140. Then, the first extraction unit 131 extracts the plurality of first markers 910 from the acquired far-infrared image (step S503), and outputs an extraction result to the far-infrared specification unit 140. Then, the second extraction unit 133 extracts the second marker candidate 820 from the acquired far-infrared image (step S505), and outputs an extraction result to the far-infrared specification unit 140.

Next, the far-infrared specification unit 140 specifies the position of each marker in the far-infrared image (step S550), and outputs information indicating the specified position of each marker in the far-infrared image to the far-infrared calibration unit 150. Then, the far-infrared calibration unit 150 calibrates the far-infrared camera 102 that captures the far-infrared image, on the basis of the position of each marker in the far-infrared image (step S507), and outputs information indicating the decided camera parameter of the far-infrared camera 102 to the external device. Then, the processes illustrated in FIG. 16 terminate.

Figure 17:
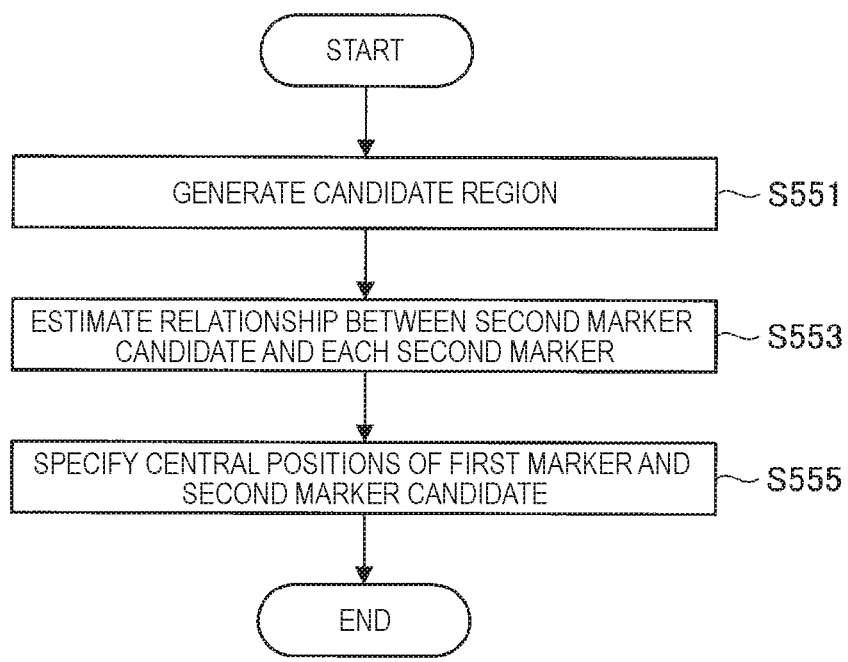
FIG. 17 is a flowchart illustrating an example of a flow of a position specification process performed by the image processing device according to the embodiment.

FIG. 17 is a flowchart illustrating an example of the flow of a position specification process performed by the image processing device 1 according to the present embodiment. The position specification process corresponds to the process of step S550 in the flowchart illustrated in FIG. 16.

As illustrated in FIG. 17, in step S550, the first generation unit 141 first generates candidate information that is information indicating a candidate for the position of the second marker 920 in a far-infrared image on the basis of the geometric relationship between the plurality of respective first markers 910 (step S551), and outputs the generated candidate information to the first estimation unit 143. Then, the first estimation unit 143 estimates the relationship between the second marker candidate 820 extracted by the second extraction unit 133 and each of the plurality of second markers 920 on the basis of the generated candidate information (step S553), and outputs information indicating the estimated relationship to the first center specification unit 145. Then, the first center specification unit 145 specifies the central positions of the first marker 910 and the second marker candidate 820 as the positions of the respective markers in the far-infrared image (step S555), and outputs information indicating the specified positions of the respective marker in the far-infrared image to the far-infrared calibration unit 150. Then, the processes illustrated in FIG. 17 terminate.

4. APPLICATION EXAMPLES

Next, various application examples will be described in detail with reference to FIGS. 18 to 25.

4-1. First Application Example

First, an image processing device 2 according to the first application example will be described with reference to FIGS. 18 to 21. The first application example is different from the embodiment described with reference to FIGS. 2 to 17 chiefly in the configuration of the image processing device 2. Therefore, the following chiefly describes the image processing device 2 according to the first application example.

Figure 18:
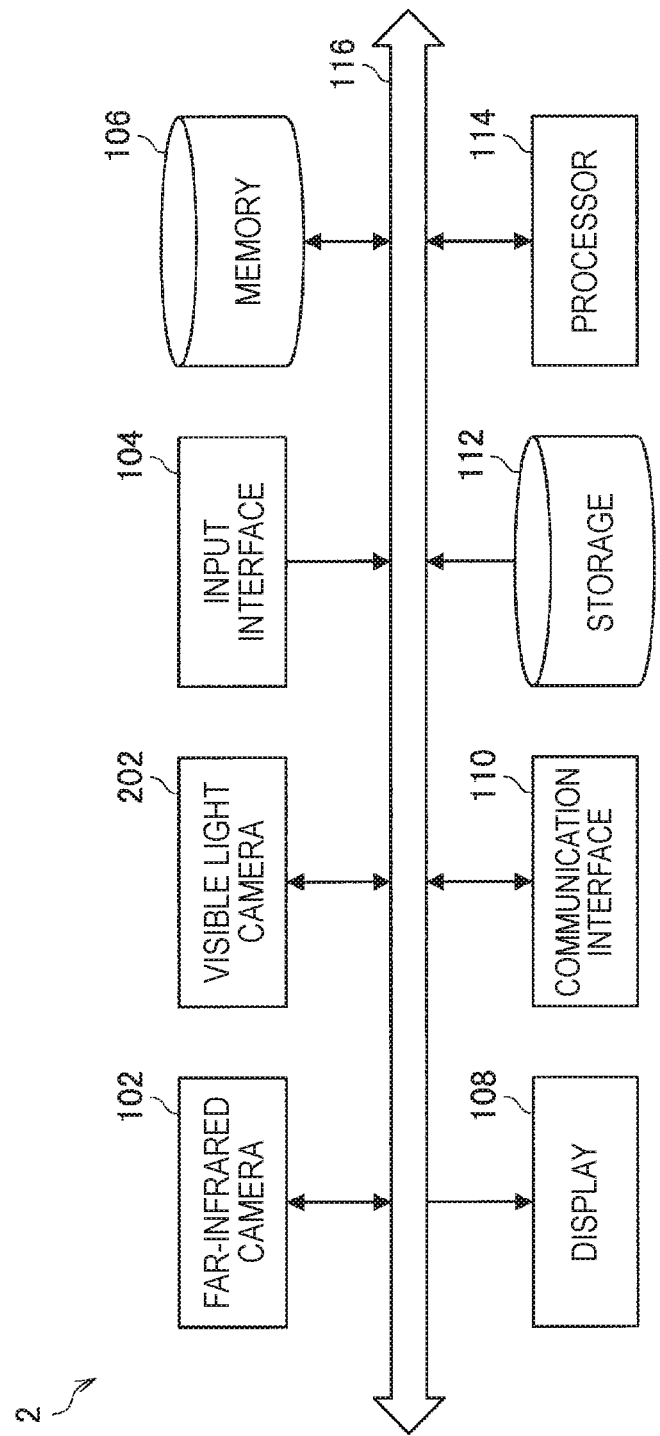
FIG. 18 is a block diagram illustrating an example of a hardware configuration of an image processing device according to a first application example.

FIG. 18 is a block diagram illustrating an example of the hardware configuration of the image processing device 2 according to the first application example. As illustrated in FIG. 18, the image processing device 2 according to the first application example is different from the image processing device 1 described above, but further includes a visible light camera 202.

The visible light camera 202 is an imaging module that performs imaging by using a visible light ray, and acquires a visible light image. Specifically, the visible light camera 202 includes an array of imaging elements that sense visible light rays different from each other in wavelength. For example, the visible light camera 202 may include an array of imaging elements that have a red region, a green region, and a blue region as the respective sensitivity regions. For example, the visible light camera 202 captures visible light images at given time intervals. In addition, a series of visible light images acquired by the visible light camera 202 may constitute video.

In the chart 9, as described above, the first marker 910, the second marker 920, and the base 930 can have different spectral reflection characteristics in a visible light region. For example, the first marker 910 has a first color, the second marker 920 has a second color, and the base 930 has a third color. Note that it is sufficient if the first color, the second color, and the third color are different from each other in spectral distribution. For example, it is sufficient if the first color, the second color, and the third color are different from each other in at least one of hue, saturation, or brightness. That makes it possible to distinguish the respective regions showing the first marker 910 and the second marker 920 from other regions in a visible light image showing the chart 9 acquired by the visible light camera 202 performing imaging, and extract them.

Note that the first marker 910, the second marker 920, and the base 930 may be different from each other in shape. In that case, the use of image processing such as template matching makes it possible to distinguish the respective regions showing the first marker 910 and the second marker 920 in a visible light image showing chart 9 from other regions, and extract them.

Figure 19:
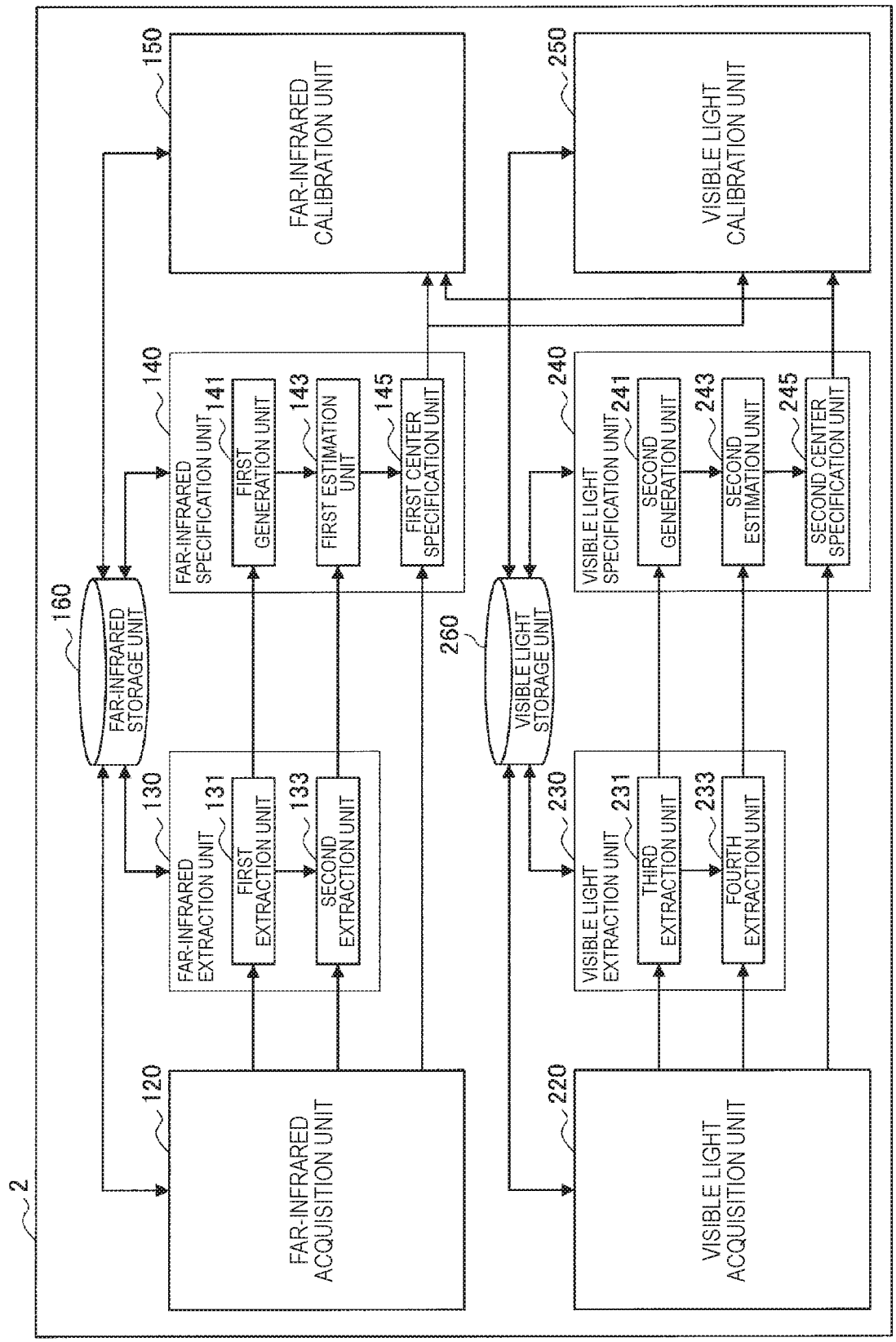
FIG. 19 is a block diagram illustrating an example of a functional configuration of the image processing device according to the first application example.

FIG. 19 is a block diagram illustrating an example of a functional configuration realized by mutual cooperation between components of the image processing device 2 illustrated in FIG. 18. As illustrated in FIG. 19, the image processing device 2 according to the first application example is different from the image processing device 1 described above, but further includes a visible light acquisition unit 220, a visible light extraction unit 230, a visible light specification unit 240, a visible light calibration unit 250, and a visible light storage unit 260.

The visible light storage unit 260 stores data which is referred to in each process performed by the image processing device 2. Specifically, the visible light storage unit 260 stores information used in the respective processes performed by the respective functional units of the visible light acquisition unit 220, the visible light extraction unit 230, the visible light specification unit 240, and the visible light calibration unit 250. In addition, the visible light storage unit 260 may also store a process result acquired according to each process performed by each functional unit. Each functional unit can acquire a process result of each process from the visible light storage unit 260. In addition, the visible light storage unit 260 may store a visible light image captured by the visible light camera 202. Each functional unit can acquire a visible light image captured by the visible light camera 202 from the visible light storage unit 260.

The visible light acquisition unit 220 acquires a visible light image. Specifically, the visible light acquisition unit 220 acquires a visible light image that is captured by the visible light camera 202 and shows the chart 9. In addition, the visible light acquisition unit 220 outputs the acquired visible light image to the visible light extraction unit 230 and the visible light specification unit 240. For example, the visible light acquisition unit 220 may directly acquire a visible light image from the visible light camera 202. In addition, the visible light acquisition unit 220 may be the visible light camera 202 itself. In addition, the visible light acquisition unit 220 may acquire a visible light image stored in the visible light storage unit 260. A visible light image acquired by the visible light acquisition unit 220 may be an image subjected to a preliminary process such as amplifying a signal and removing noise.

The visible light extraction unit 230 distinguishes a region showing a specific object from other regions, and extracts it from a visible light image acquired by the visible light acquisition unit 220. In addition, the visible light extraction unit 230 outputs an extraction result to the visible light specification unit 240. The visible light extraction unit 230 includes a third extraction unit 231 and a fourth extraction unit 233, for example, as illustrated in FIG. 19.

The third extraction unit 231 extracts the plurality of first markers 910 from a visible light image. Specifically, the third extraction unit 231 extracts the plurality of first markers 910 from a visible light image acquired by the visible light acquisition unit 220, and outputs an extraction result to the visible light specification unit 240. The third extraction unit 231 performs a binarizing process, for example, on a visible light image, thereby extracting the plurality of first markers 910. Specifically, the third extraction unit 231 allocates the second pixel value that is a relatively high value to a pixel having a pixel value corresponding to the first color in a visible light image, and allocates the first pixel value that is a relatively low value to another pixel on the basis of the relationship between the spectral reflection characteristics of the first marker 910, the second marker 920, and the base 930. That allocates the second pixel value to a region showing each first marker 910, thereby allowing the plurality of first markers 910 to be extracted.

The fourth extraction unit 233 extracts a second marker candidate that is a candidate for each of the plurality of second markers 920 from a visible light image. Specifically, the fourth extraction unit 233 extracts a second marker candidate from a visible light image acquired by the visible light acquisition unit 220, and outputs an extraction result to the visible light specification unit 240. The fourth extraction unit 233 performs a binarizing process, for example, on a visible light image, thereby extracting a second marker candidate. Specifically, the fourth extraction unit 233 allocates the second pixel value that is a relatively high value to a pixel having a pixel value corresponding to the first color or the second color in a visible light image, and allocates the first pixel value that is a relatively low value to another pixel on the basis of the relationship between the spectral reflection characteristics of the first marker 910, the second marker 920, and the base 930. That causes the second pixel value to be allocated to at least a region showing the second marker 920 in the visible light image, thereby allowing the second marker candidate to be extracted.

The visible light specification unit 240 specifies the position of each marker in a visible light image. In addition, the visible light specification unit 240 outputs information indicating the specified position of each marker in a visible light image to the visible light calibration unit 250 and the far-infrared calibration unit 150. In the first application example, the visible light specification unit 240 specifies the position of each of the plurality of respective second markers 920 in a visible light image on the basis of the geometric relationship between the plurality of respective first markers 910. The visible light specification unit 240 includes a second generation unit 241, a second estimation unit 243, and a second center specification unit 245, for example, as illustrated in FIG. 19.

The second generation unit 241 generates candidate information on the basis of the geometric relationship between the plurality of respective first markers 910. The candidate information is information indicating a candidate for the position of the second marker 920 in a visible light image. In addition, the second generation unit 241 outputs the generated candidate information to the second estimation unit 243. The second generation unit 241 may generate a straight line in a visible light image which corresponds to a straight line passing through the second marker 920, for example, in a real space as candidate information.

The second estimation unit 243 estimates the relationship between the second marker candidate extracted by the fourth extraction unit 233 and each of the plurality of second markers 920 on the basis of the geometric relationship between the plurality of respective first markers 910. In other words, the second estimation unit 243 estimates which of the second markers 920 the second marker candidate is on the basis of the geometric relationship between the plurality of respective first markers 910. In addition, the second estimation unit 243 outputs information indicating the estimated relationship described above to the second center specification unit 245. Specifically, the second estimation unit 243 estimates the relationship described above on the basis of candidate information generated by the second generation unit 241.

In this way, estimating the relationship described above on the basis of the geometric relationship between the plurality of respective first markers 910 makes it possible to precisely estimate the relationship described above. That allows the position of each of the plurality of second markers 920 in a visible light image to be precisely specified.

The second center specification unit 245 specifies the central position of a second marker candidate extracted by the fourth extraction unit 233 as the position of the second marker 920 in a visible light image which is associated according to the relationship estimated by the second estimation unit 243. In addition, the second center specification unit 245 specifies the central position of the first marker 910 extracted by the third extraction unit 231 as the position of the first marker 910 in a visible light image. The second center specification unit 245 outputs information indicating the specified position of each marker in a visible light image to the visible light calibration unit 250 and the far-infrared calibration unit 150. The second center specification unit 245 uses, for example, image processing such as ellipse fitting, and can hereby specify the central positions of the first marker 910 and the second marker candidate.

In this way, specifying the central position of the second marker candidate as the position of the second marker 920 in a visible light image which is associated according to the relationship estimated by the second estimation unit 243 allows the position of each of the plurality of second markers 920 in the visible light image to be more precisely specified. In addition, specifying the central position of the first marker 910 extracted by the third extraction unit 231 as the position of the first marker 910 in a visible light image allows the position of each of the plurality of first markers 910 in the visible light image to be more precisely specified.

In the first application example, the far-infrared specification unit 140 also outputs information indicating the position of each marker in a far-infrared image to the visible light calibration unit 250. Specifically, the first center specification unit 145 outputs information indicating the position of each marker in a far-infrared image to the far-infrared calibration unit 150 and the visible light calibration unit 250.

The visible light calibration unit 250 calibrates the visible light camera 202 that captures a visible light image on the basis of the position of each marker in a far-infrared image and the position of each marker in the visible light image. Specifically, the visible light calibration unit 250 calibrates the visible light camera 202 on the basis of the position of each of the plurality of second markers 920 in a far-infrared image and the position of each of the plurality of second markers 920 in a visible light image. More specifically, the visible light calibration unit 250 calibrates the visible light camera 202 on the basis of the respective positions of both each of the plurality of first markers 910 and each of the plurality of second markers 920 in a far-infrared image and a visible light image.

The visible light calibration unit 250 substitutes, as described above, the positions of respective markers in a far-infrared image and a visible light image into the two-dimensional coordinates (x, y) in the expression (1), and solves the plurality of acquired equations as optimization problems, thereby deciding a camera parameter of the visible light camera 202. Specifically, the visible light calibration unit 250 decides the internal parameter A and the external parameter [RIT] of the visible light camera 202 on the basis of the positions of the respective markers in a far-infrared image and a visible light image. Specifically, the external parameter [RIT] is a parameter indicating the relative attitude and position of the visible light camera 202 with respect to the far-infrared camera 102.

In addition, the far-infrared calibration unit 150 calibrates the far-infrared camera 102 on the basis of the position of each marker in a far-infrared image and the position of each marker in a visible light image. Specifically, the far-infrared calibration unit 150 calibrates the far-infrared camera 102 on the basis of the position of each of the plurality of second markers 920 in a far-infrared image and the position of each of the plurality of second markers 920 in a visible light image. More specifically, the far-infrared calibration unit 150 calibrates the far-infrared camera 102 on the basis of the respective positions of both each of the plurality of first markers 910 and each of the plurality of second markers 920 in a far-infrared image and a visible light image.

The far-infrared calibration unit 150 substitutes, as described above, the positions of respective markers in a far-infrared image and a visible light image into the two-dimensional coordinates (x, y) in the expression (1), and solves the plurality of acquired equations as optimization problems, thereby deciding a camera parameter of the far-infrared camera 102. Specifically, the far-infrared calibration unit 150 decides the internal parameter A and the external parameter [RIT] of the far-infrared camera 102 on the basis of the positions of the respective markers in a far-infrared image and a visible light image. Specifically, the external parameter [RIT] is a parameter indicating the relative attitude and position of the far-infrared camera 102 with respect to the visible light camera 202.

In this way, the image processing device 2 according to the first application example executes calibration between the far-infrared camera 102 and the visible light camera 202. In addition, the first marker 910, the second marker 920, and the base 930 have different spectral reflection characteristics in a visible light region, thereby making it possible to perform calibration between the far-infrared camera 102 and the visible light camera 202 with the same chart 9. That makes it possible to more easily perform calibration between the far-infrared camera 102 and the visible light camera 202.

The visible light calibration unit 250 and the far-infrared calibration unit 150 respectively output information indicating the decided camera parameters of the visible light camera 202 and the far-infrared camera 102 to the external device. The visible light camera 202 and the external device into which the information indicating the camera parameter of the far-infrared camera 102 is input perform various kinds of image processing on the basis of the information. For example, the external device can perform a process of reducing camera distortion in each of an acquired visible light image and far-infrared image on the basis of the information. In addition, the external device can perform a rectification process that is a process of collimating an acquired visible light image and far-infrared image on the basis of the information. In addition, the external device can perform a process of making substantially the same the scale of the same target objects shown in an acquired visible light image and far-infrared image on the basis of the information. Note that the visible light calibration unit 250 and the far-infrared calibration unit 150 may respectively cause the visible light storage unit 260 and the far-infrared storage unit 160 to store the information indicating the decided camera parameters of the visible light camera 202 and the far-infrared camera 102.

According to the image processing device 2 according to the first application example as described above, the visible light specification unit 240 specifies the position of each of the plurality of respective second markers 920 in a visible light image on the basis of the geometric relationship between the plurality of respective first markers 910. Even in the case where a visible light image showing the chart 9 does not show some of the second markers 920, that makes it possible to specify the position of each marker in the visible light image. Therefore, it is also possible for a visible light image showing markers at the ends to specify the position of each marker in the visible light image. Therefore, it is possible to sufficiently secure information used for calibration between the far-infrared camera 102 and the visible light camera 202. Therefore, it is possible to improve calibration precision between the far-infrared camera 102 and the visible light camera 202.

In addition, the image processing device 2 according to the first application example calibrates the far-infrared camera 102 and the visible light camera 202, as described above, on the basis of the position of each of the plurality of second markers 920 in a far-infrared image which is specified by the far-infrared specification unit 140 and the position of each of the plurality of second markers 920 in a visible light image which is specified by the visible light specification unit 240. That achieves precise calibration as calibration between the far-infrared camera 102 and the visible light camera 202.

Next, the flow of a process performed by the image processing device 2 according to the first application example will be described with reference to FIGS. 20 and 21.

Figure 20:
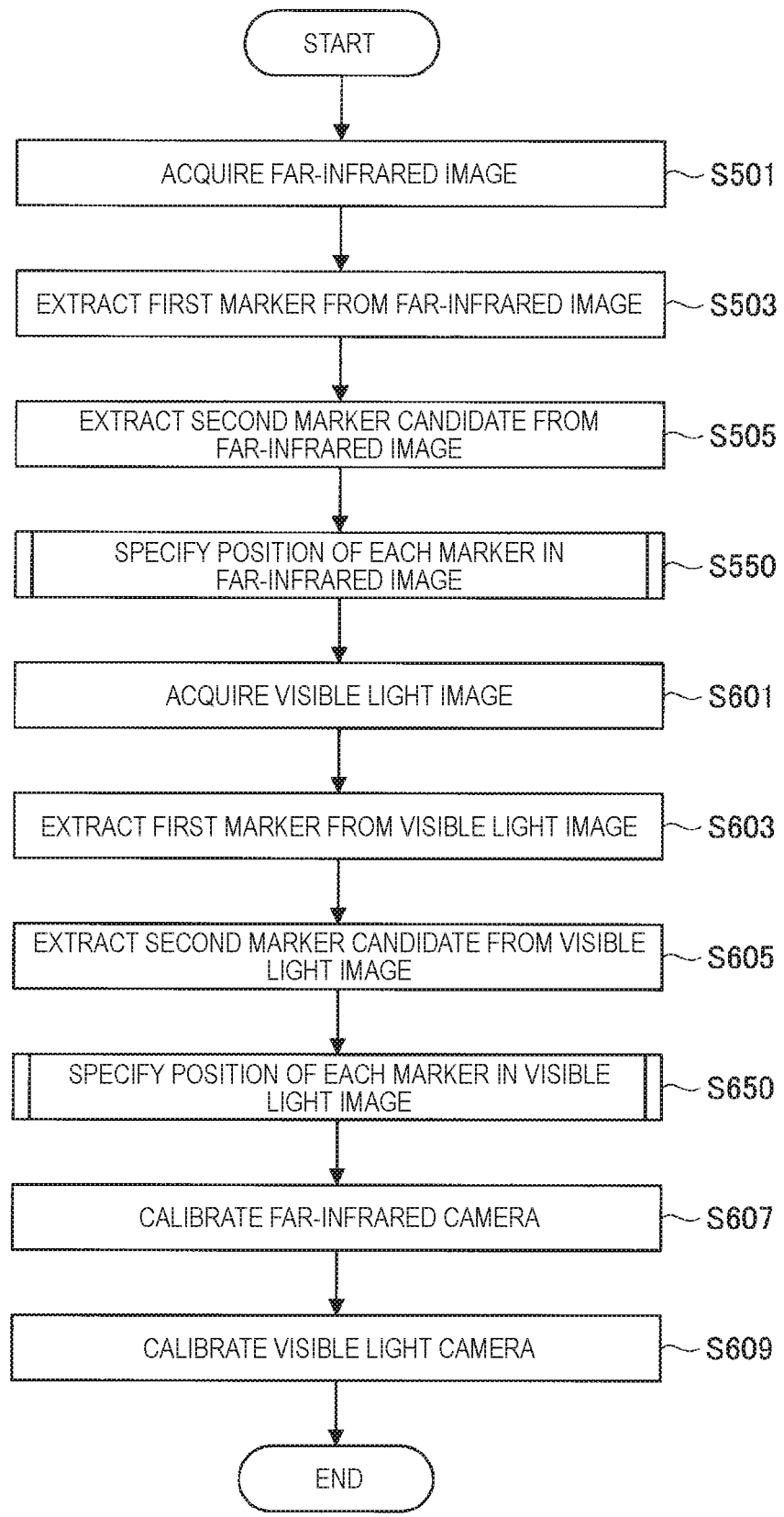
FIG. 20 is a flowchart illustrating an example of a flow of a process performed by the image processing device according to the first application example.

FIG. 20 is a flowchart illustrating an example of the flow of the process performed by the image processing device 2 according to the first application example. The flow of processes according to the first application example is different from the flow of processes performed by the image processing device 1 described with reference to FIGS. 16 and 17 in the processes subsequent to the position specification process (step S550) performed by the far-infrared specification unit 140. Note that, in the process of step S550 in the first application example, the far-infrared specification unit 140 outputs information indicating the specified position of each marker in a far-infrared image to the far-infrared calibration unit 150 and the visible light calibration unit 250.

As illustrated in FIG. 20, in the first application example, the visible light acquisition unit 220 acquires a visible light image showing the chart 9 after the position specification process (step S550) performed by the far-infrared specification unit 140 (step S601), and outputs the acquired visible light image to the visible light extraction unit 230 and the visible light specification unit 240. Then, the third extraction unit 231 extracts the plurality of first markers 910 from the acquired visible light image (step S603), and outputs an extraction result to the visible light specification unit 240. Then, the fourth extraction unit 233 extracts a second marker candidate from the acquired visible light image (step S605), and outputs an extraction result to the visible light specification unit 240.

Next, the visible light specification unit 240 specifies the position of each marker in a visible light image (step S650), and outputs information indicating the specified position of each marker in the visible light image to the visible light calibration unit 250 and the far-infrared calibration unit 150. Then, the far-infrared calibration unit 150 calibrates the far-infrared camera 102 that captures the far-infrared image, on the basis of the position of each marker in the far-infrared image and the position of each marker in the visible light image (step S607), and outputs information indicating the decided camera parameter of the far-infrared camera 102 to the external device. Then, the visible light calibration unit 250 calibrates the visible light camera 202 that captures the visible light image, on the basis of the position of each marker in the far-infrared image and the position of each marker in the visible light image (step S609), and outputs information indicating the decided camera parameter of the visible light camera 202 to the external device. Then, the processes illustrated in FIG. 20 terminate.

Figure 21:
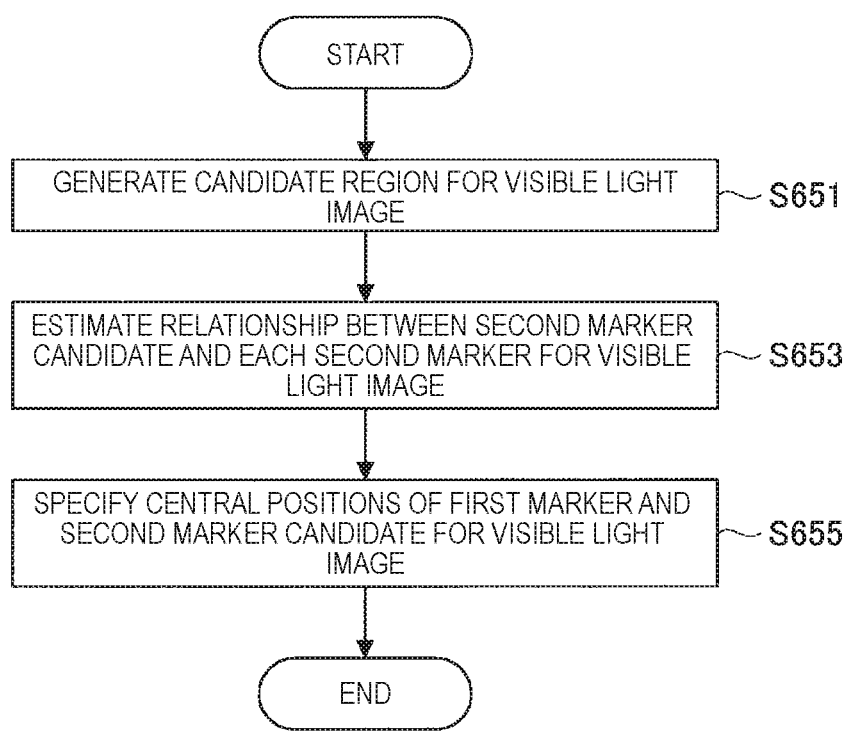
FIG. 21 is a flowchart illustrating an example of a flow of a position specification process performed by the image processing device according to the first application example for a visible light image.

FIG. 21 is a flowchart illustrating an example of the flow of the position specification process performed by the image processing device 2 according to the first application example. The position specification process corresponds to the process of step S650 in the flowchart illustrated in FIG. 20.

As illustrated in FIG. 21, in step S650, the second generation unit 241 first generates candidate information that is information indicating a candidate for the position of the second marker 920 in a visible light image on the basis of the geometric relationship between the plurality of respective first markers 910 (step S651), and outputs the generated candidate information to the second estimation unit 243. Then, the second estimation unit 243 estimates the relationship between the second marker candidate extracted by the fourth extraction unit 233 and each of the plurality of second markers 920 on the basis of the generated candidate information (step S653), and outputs information indicating the estimated relationship to the second center specification unit 245. Then, the second center specification unit 245 specifies the central positions of the first marker 910 and the second marker candidate as the positions of the respective markers in the visible light image (step S655), and outputs information indicating the specified positions of the respective marker in the visible light image to the visible light calibration unit 250 and the far-infrared calibration unit 150. Then, the processes illustrated in FIG. 21 terminate.

4-2. Second Application Example

Next, an image processing device 3 according to the second application example will be described with reference to FIGS. 22 to 25. The second application example is different from the embodiment described with reference to FIGS. 2 to 17 chiefly in the configuration of the image processing device 3. Therefore, the following chiefly describes the image processing device 3 according to the second application example.

Figure 22:
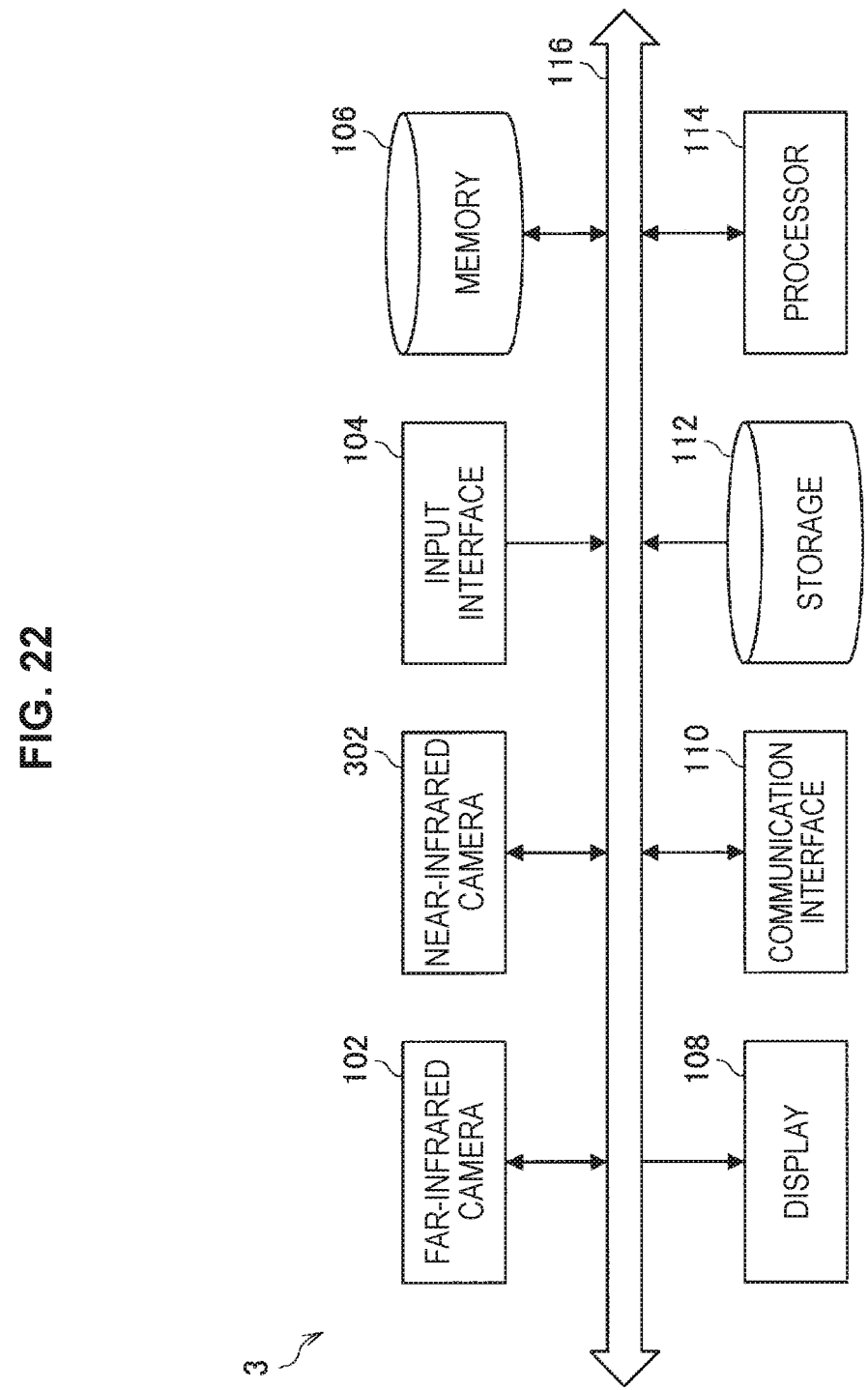
FIG. 22 is a block diagram illustrating an example of a hardware configuration of an image processing device according to a second application example.

FIG. 22 is a block diagram illustrating an example of the hardware configuration of the image processing device 3 according to the second application example. As illustrated in FIG. 22, the image processing device 3 according to the second application example is different from the image processing device 1 described above, but further includes a near-infrared camera 302.

The near-infrared camera 302 is an imaging module that performs imaging by using near-infrared rays, and acquires a near-infrared image. Specifically, the near-infrared camera 302 has an array of imaging elements that sense near-infrared rays with wavelengths belonging to the NIR region. In addition, the near-infrared camera 302 also includes a light emitting element that irradiates the area in the vicinity of a device with near-infrared rays having the wavelength belonging to the NIR region. For example, the near-infrared camera 302 radiates near-infrared rays from the light emitting element in accordance with a trigger such as a user input or periodically, and captures the near-infrared rays reflected by a subject or the background thereof, thereby acquiring a near-infrared image. For example, the near-infrared camera 302 captures near-infrared images at given time intervals. In addition, a series of near-infrared images acquired by the near-infrared camera 302 may constitute video.

In the chart 9, as described above, the first marker 910, the second marker 920, and the base 930 can have different spectral reflection characteristics in a near-infrared region. For example, the first marker 910 has a first characteristic, the second marker 920 has a second characteristic, and the base 930 has a third characteristic. That makes it possible to distinguish the respective regions showing the first marker 910 and the second marker 920 from other regions in a near-infrared image showing the chart 9 acquired by the near-infrared camera 302 performing imaging, and extract them.

Figure 23:
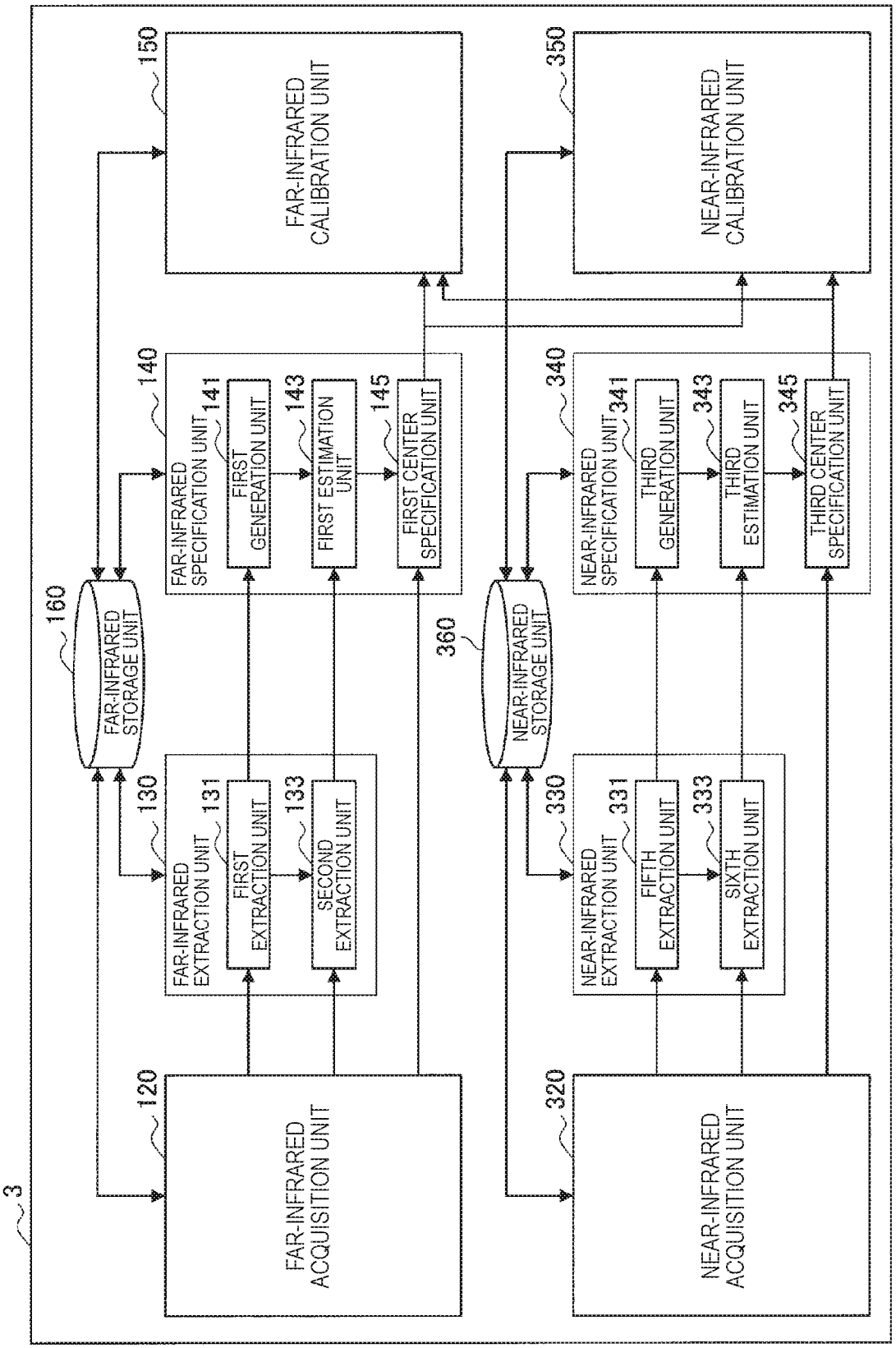
FIG. 23 is a block diagram illustrating an example of a functional configuration of the image processing device according to the second application example.

FIG. 23 is a block diagram illustrating an example of a functional configuration realized by mutual cooperation between components of the image processing device 3 illustrated in FIG. 22. As illustrated in FIG. 23, the image processing device 3 according to the second application example is different from the image processing device 1 as described above, but further includes a near-infrared acquisition unit 320, a near-infrared extraction unit 330, a near-infrared specification unit 340, a near-infrared calibration unit 350, and a near-infrared storage unit 360.

The near-infrared storage unit 360 stores data that is referred to in each process performed by the image processing device 3. Specifically, the near-infrared storage unit 360 stores information used in the respective processes performed by the respective functional units of the near-infrared acquisition unit 320, the near-infrared extraction unit 330, the near-infrared specification unit 340, and the near-infrared calibration unit 350. In addition, the near-infrared storage unit 360 may also store a process result acquired according to each process performed by each functional unit. Each functional unit can acquire a process result of each process from the near-infrared storage unit 360. In addition, the near-infrared storage unit 360 may store a near-infrared image captured by the near-infrared camera 302. Each functional unit can acquire a near-infrared image captured by the near-infrared camera 302 from the near-infrared storage unit 360.

The near-infrared acquisition unit 320 acquires a near-infrared image. Specifically, the near-infrared acquisition unit 320 acquires a near-infrared image captured by the near-infrared camera 302 and showing the chart 9. In addition, the near-infrared acquisition unit 320 outputs the acquired near-infrared image to the near-infrared extraction unit 330 and the near-infrared specification unit 340. For example, the near-infrared acquisition unit 320 may directly acquire a near-infrared image from the near-infrared camera 302. In addition, the near-infrared acquisition unit 320 may be the near-infrared camera 302 itself. In addition, the near-infrared acquisition unit 320 may acquire a near-infrared image stored in the near-infrared storage unit 360. A near-infrared image acquired by the near-infrared acquisition unit 320 may be an image subjected to a preliminary process such as amplifying a signal and removing noise.

The near-infrared extraction unit 330 distinguishes a region showing a specific object from other regions, and extracts it from a near-infrared image acquired by the near-infrared acquisition unit 320. In addition, the near-infrared extraction unit 330 outputs an extraction result to the near-infrared specification unit 340. The near-infrared extraction unit 330 includes a fifth extraction unit 331 and a sixth extraction unit 333, for example, as illustrated in FIG. 23.

The fifth extraction unit 331 extracts the plurality of first markers 910 from a near-infrared image. Specifically, the fifth extraction unit 331 extracts the plurality of first markers 910 from a near-infrared image acquired by the near-infrared acquisition unit 320, and outputs an extraction result to the near-infrared specification unit 340. The fifth extraction unit 331 performs a binarizing process, for example, on a near-infrared image, thereby extracting the plurality of first markers 910. Specifically, the fifth extraction unit 331 allocates the second pixel value that is a relatively high value to a pixel having a pixel value corresponding to the first characteristic in a near-infrared image, and allocates the first pixel value that is a relatively low value to another pixel on the basis of the relationship between the spectral reflection characteristics of the first marker 910, the second marker 920, and the base 930. That allocates the second pixel value to a region showing each first marker 910, thereby allowing the plurality of first markers 910 to be extracted.

The sixth extraction unit 333 extracts a second marker candidate that is a candidate for each of the plurality of second markers 920 from a near-infrared image. Specifically, the sixth extraction unit 333 extracts the second marker candidate from a near-infrared image acquired by the near-infrared acquisition unit 320, and outputs an extraction result to the near-infrared specification unit 340. The sixth extraction unit 333 performs a binarizing process, for example, on a near-infrared image, thereby extracting a second marker candidate. Specifically, the sixth extraction unit 333 allocates the second pixel value that is a relatively high value to a pixel having a pixel value corresponding to the first characteristic or the second characteristic in a near-infrared image, and allocates the first pixel value that is a relatively low value to another pixel on the basis of the relationship between the spectral reflection characteristics of the first marker 910, the second marker 920, and the base 930. That causes the second pixel value to be allocated to at least a region showing the second marker 920 in the near-infrared image, thereby allowing the second marker candidate to be extracted.

The near-infrared specification unit 340 specifies the position of each marker in a near-infrared image. In addition, the near-infrared specification unit 340 outputs information indicating the specified position of each marker in a near-infrared image to the near-infrared calibration unit 350 and the far-infrared calibration unit 150. In the second application example, the near-infrared specification unit 340 specifies the position of each of the plurality of second markers 920 in a near-infrared image on the basis of the geometric relationship between the plurality of respective first markers 910. The near-infrared specification unit 340 includes a third generation unit 341, a third estimation unit 343, and a third center specification unit 345, for example, as illustrated in FIG. 23.

The third generation unit 341 generates candidate information on the basis of the geometric relationship between the plurality of respective first markers 910. The candidate information is information indicating a candidate for the position of the second marker 920 in a near-infrared image. In addition, the third generation unit 341 outputs the generated candidate information to the third estimation unit 343. The third generation unit 341 may generate a straight line in a near-infrared image which corresponds to a straight line passing through the second marker 920, for example, in a real space as candidate information.

The third estimation unit 343 estimates the relationship between the second marker candidate extracted by the sixth extraction unit 333 and each of the plurality of second markers 920 on the basis of the geometric relationship between the plurality of respective first markers 910. In other words, the third estimation unit 343 estimates which of the second markers 920 the second marker candidate is on the basis of the geometric relationship between the plurality of respective first markers 910. In addition, the third estimation unit 343 outputs information indicating the estimated relationship to the third center specification unit 345. Specifically, the third estimation unit 343 estimates the relationship on the basis of candidate information generated by the third generation unit 341.

In this way, estimating the relationship described above on the basis of the geometric relationship between the plurality of respective first markers 910 makes it possible to precisely estimate the relationship described above. That allows the position of each of the plurality of second markers 920 in a near-infrared image to be precisely specified.

The third center specification unit 345 specifies the central position of a second marker candidate extracted by the sixth extraction unit 333 as the position of the second marker 920 in a near-infrared image which is associated according to the relationship estimated by the third estimation unit 343. In addition, the third center specification unit 345 specifies the central position of the first marker 910 extracted by the fifth extraction unit 331 as the position of the first marker 910 in a near-infrared image. The third center specification unit 345 outputs information indicating the specified position of each marker in a near-infrared image to the near-infrared calibration unit 350 and the far-infrared calibration unit 150. The third center specification unit 345 uses, for example, image processing such as ellipse fitting, and can hereby specify the central positions of the first marker 910 and the second marker candidate.

In this way, specifying the central position of the second marker candidate as the position of the second marker 920 in a far-infrared image which is associated according to the relationship estimated by the third estimation unit 343 allows the position of each of the plurality of second markers 920 in the near-infrared image to be more precisely specified. In addition, specifying the central position of the first marker 910 extracted by the fifth extraction unit 331 as the position of the first marker 910 in a near-infrared image allows the position of each of the plurality of first markers 910 in the near-infrared image to be more precisely specified.

In the second application example, the far-infrared specification unit 140 also outputs information indicating the position of each marker in a far-infrared image to the near-infrared calibration unit 350. Specifically, the first center specification unit 145 outputs information indicating the position of each marker in a far-infrared image to the far-infrared calibration unit 150 and the near-infrared calibration unit 350.

The near-infrared calibration unit 350 calibrates the near-infrared camera 302 that captures a near-infrared image on the basis of the position of each marker in a near-infrared image and the position of each marker in the near-infrared image. Specifically, the near-infrared calibration unit 350 calibrates the near-infrared camera 302 on the basis of the position of each of the plurality of second markers 920 in a far-infrared image and the position of each of the plurality of second markers 920 in a near-infrared image. More specifically, the near-infrared calibration unit 350 calibrates the near-infrared camera 302 on the basis of the respective positions of both each of the plurality of first markers 910 and each of the plurality of second markers 920 in a far-infrared image and a near-infrared image.

The near-infrared calibration unit 350 substitutes, as described above, the positions of respective markers in a far-infrared image and a near-infrared image into the two-dimensional coordinates (x, y) in the expression (1), and solves the plurality of acquired equations as optimization problems, thereby deciding a camera parameter of the near-infrared camera 302. Specifically, the near-infrared calibration unit 350 decides the internal parameter A and the external parameter [RIT] of the near-infrared camera 302 on the basis of the positions of the respective markers in a far-infrared image and a near-infrared image. Specifically, the external parameter [RIT] is a parameter indicating the relative attitude and position of the near-infrared camera 302 with respect to the far-infrared camera 102.

In addition, the far-infrared calibration unit 150 calibrates the far-infrared camera 102 on the basis of the position of each marker in a far-infrared image and the position of each marker in a near-infrared image. Specifically, the far-infrared calibration unit 150 calibrates the far-infrared camera 102 on the basis of the position of each of the plurality of second markers 920 in a far-infrared image and the position of each of the plurality of second markers 920 in a near-infrared image. More specifically, the far-infrared calibration unit 150 calibrates the far-infrared camera 102 on the basis of the respective positions of both each of the plurality of first markers 910 and each of the plurality of second markers 920 in a far-infrared image and a near-infrared image.

The far-infrared calibration unit 150 substitutes, as described above, the positions of respective markers in a far-infrared image and a near-infrared image into the two-dimensional coordinates (x, y) in the expression (1), and solves the plurality of acquired equations as optimization problems, thereby deciding a camera parameter of the far-infrared camera 102. Specifically, the far-infrared calibration unit 150 decides the internal parameter A and the external parameter [RIT] of the far-infrared camera 102 on the basis of the positions of the respective markers in a far-infrared image and a near-infrared image. Specifically, the external parameter [RIT] is a parameter indicating the relative attitude and position of the far-infrared camera 102 with respect to the near-infrared camera 302.

In this way, the image processing device 3 according to the second application example executes calibration between the far-infrared camera 102 and the near-infrared camera 302. In addition, the first marker 910, the second marker 920, and the base 930 have different spectral reflection characteristics in a near-infrared region, thereby making it possible to perform calibration between the far-infrared camera 102 and the near-infrared camera 302 with the same chart 9. That makes it possible to more easily perform calibration between the far-infrared camera 102 and the near-infrared camera 302.

The near-infrared calibration unit 350 and the far-infrared calibration unit 150 respectively output information indicating the decided camera parameters of the near-infrared camera 302 and the far-infrared camera 102 to the external device. The near-infrared camera 302 and the external device into which the information indicating the camera parameter of the far-infrared camera 102 is input perform various kinds of image processing on the basis of the information. For example, the external device can perform a process of reducing camera distortion in each of an acquired near-infrared image and far-infrared image on the basis of the information. In addition, the external device can perform a rectification process that is a process of collimating an acquired near-infrared image and far-infrared image on the basis of the information. In addition, the external device can perform a process of making substantially the same the scale of the same target objects shown in an acquired near-infrared image and far-infrared image on the basis of the information. Note that the near-infrared calibration unit 350 and the far-infrared calibration unit 150 may respectively cause the near-infrared storage unit 360 and the far-infrared storage unit 160 to store the information indicating the decided camera parameters of the near-infrared camera 302 and the far-infrared camera 102.

According to the image processing device 3 according to the second application example as described above, the near-infrared specification unit 340 specifies the position of each of the plurality of respective second markers 920 in a near-infrared image on the basis of the geometric relationship between the plurality of respective first markers 910. Even in the case where a near-infrared image showing the chart 9 does not show some of the second markers 920, that makes it possible to specify the position of each marker in the near-infrared image. Therefore, it is also possible for a near-infrared image showing markers at the ends to specify the position of each marker in the near-infrared image. Therefore, it is possible to sufficiently secure information used for calibration between the far-infrared camera 102 and the near-infrared camera 302. Therefore, it is possible to improve calibration precision between the far-infrared camera 102 and the near-infrared camera 302.

In addition, the image processing device 3 according to the second application example calibrates the far-infrared camera 102 and the near-infrared camera 302, as described above, on the basis of the position of each of the plurality of second markers 920 in a far-infrared image which is specified by the far-infrared specification unit 140 and the position of each of the plurality of second markers 920 in a near-infrared image which is specified by the near-infrared specification unit 340. That achieves precise calibration as calibration between the far-infrared camera 102 and the near-infrared camera 302.

Next, the flow of a process performed by the image processing device 3 according to the second application example will be described with reference to FIGS. 24 and 25.

Figure 24:
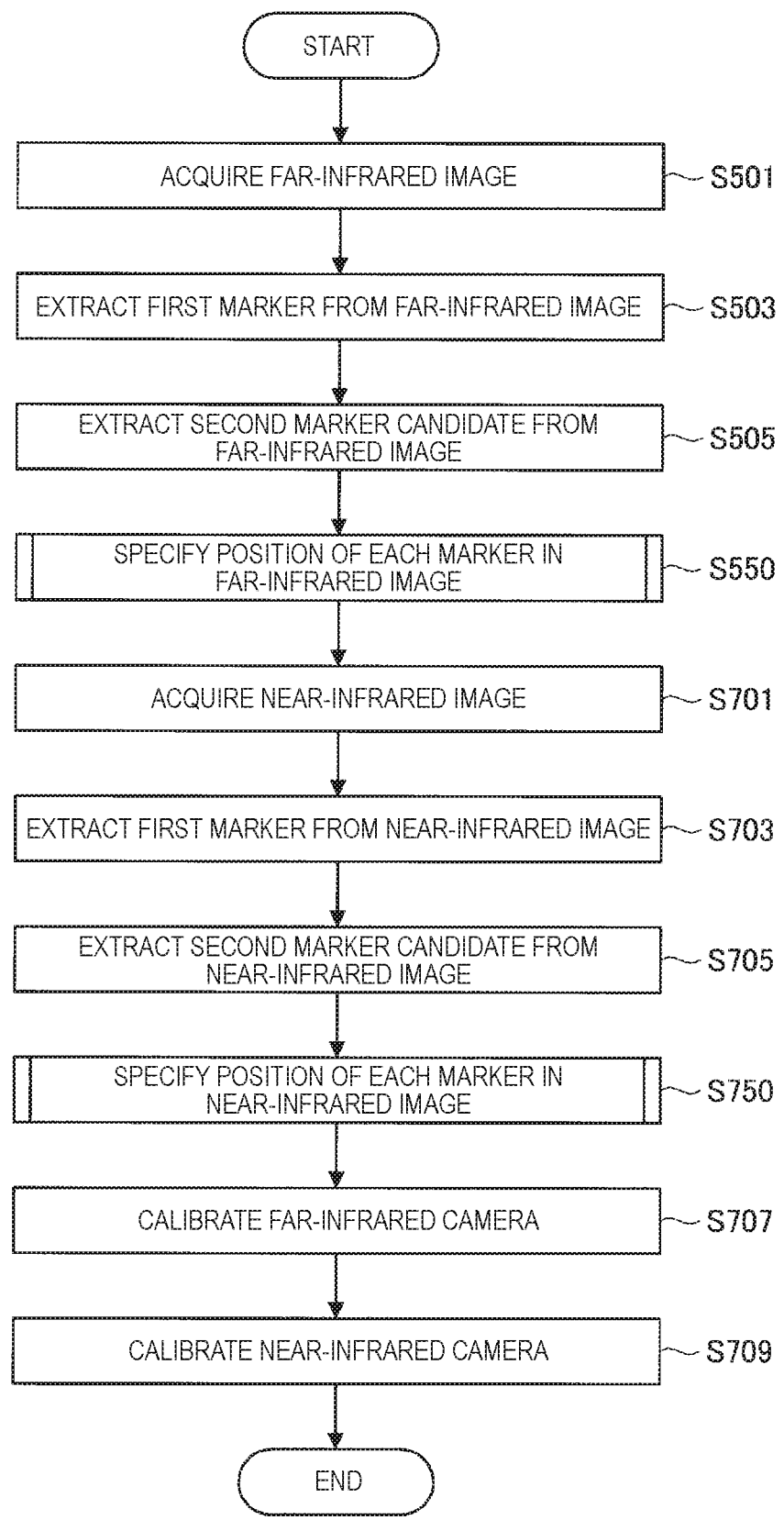
FIG. 24 is a flowchart illustrating an example of a flow of a process performed by the image processing device according to the second application example.

FIG. 24 is a flowchart illustrating an example of the flow of the process performed by image processing device 3 according to the second application example. The flow of processes according to the second application example is different from the flow of processes performed by the image processing device 1 described with reference to FIGS. 16 and 17 in the processes subsequent to the position specification process (step S550) performed by the far-infrared specification unit 140. Note that, in the process of step S550 in the second application example, the far-infrared specification unit 140 outputs information indicating the specified position of each marker in a far-infrared image to the far-infrared calibration unit 150 and the near-infrared calibration unit 350.

As illustrated in FIG. 24, in the second application example, the near-infrared acquisition unit 320 acquires a near-infrared image showing the chart 9 after the position specification process (step S550) performed by the far-infrared specification unit 140 (step S701), and outputs the acquired near-infrared image to the near-infrared extraction unit 330 and the near-infrared specification unit 340. Then, the fifth extraction unit 331 extracts the plurality of first markers 910 from the acquired near-infrared image (step S703), and outputs an extraction result to the near-infrared specification unit 340. Then, the sixth extraction unit 333 extracts the second marker candidate from the acquired near-infrared image (step S705), and outputs an extraction result to the near-infrared specification unit 340.

Next, the near-infrared specification unit 340 specifies the position of each marker in the near-infrared image (step S750), and outputs information indicating the specified position of each marker in the near-infrared image to the near-infrared calibration unit 350 and the far-infrared calibration unit 150. Then, the far-infrared calibration unit 150 calibrates the far-infrared camera 102 that captures the far-infrared image, on the basis of the position of each marker in the far-infrared image and the position of each marker in the near-infrared image (step S707), and outputs information indicating the decided camera parameter of the far-infrared camera 102 to the external device. Then, the near-infrared calibration unit 350 calibrates the near-infrared camera 302 that captures the near-infrared image, on the basis of the position of each marker in the far-infrared image and the position of each marker in the near-infrared image (step S709), and outputs information indicating the decided camera parameter of the near-infrared camera 302 to the external device. Then, the processes illustrated in FIG. 24 terminate.

Figure 25:
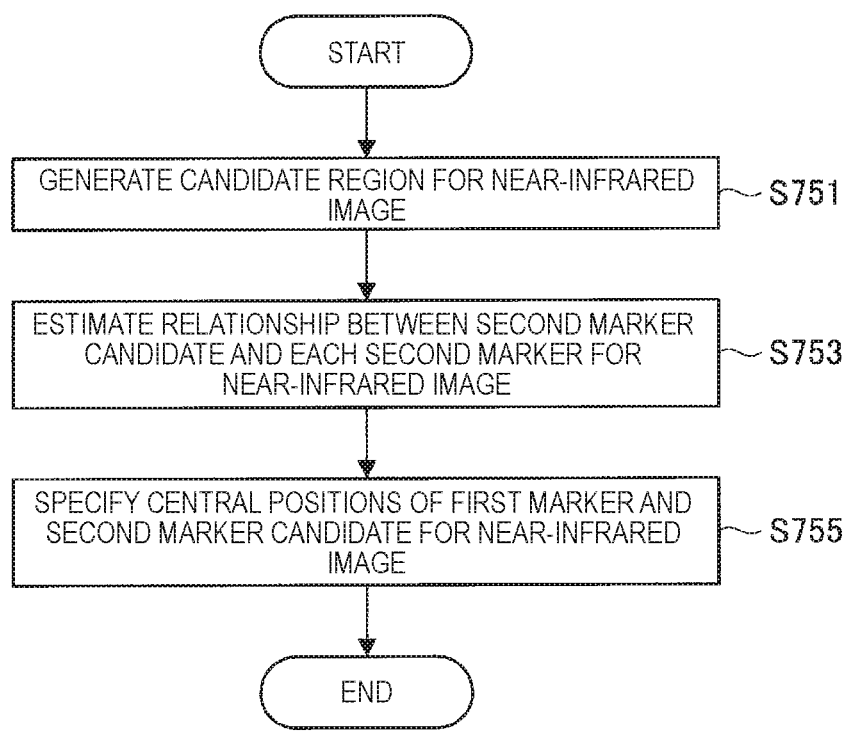
FIG. 25 is a flowchart illustrating an example of a flow of a position specification process performed by the image processing device according to the second application example for a near-infrared image.

FIG. 25 is a flowchart illustrating an example of the flow of the position specification process performed by the image processing device 3 according to the second application example. The position specification process corresponds to the process of step S750 in the flowchart illustrated in FIG. 24.

As illustrated in FIG. 25, in step S750, the third generation unit 341 first generates candidate information that is information indicating a candidate for the position of the second marker 920 in a near-infrared image on the basis of the geometric relationship between the plurality of respective first markers 910 (step S751), and outputs the generated candidate information to the third estimation unit 343. Then, the third estimation unit 343 estimates the relationship between the second marker candidate extracted by the sixth extraction unit 333 and each of the plurality of second markers 920 on the basis of the generated candidate information (step S753), and outputs information indicating the estimated relationship to the third center specification unit 345. Then, the third center specification unit 345 specifies the central positions of the first marker 910 and the second marker candidate as the positions of the respective markers in the near-infrared image (step S755), and outputs information indicating the specified positions of the respective marker in the near-infrared image to the near-infrared calibration unit 350 and the far-infrared calibration unit 150. Then, the processes illustrated in FIG. 25 terminate.

5. CONCLUSION

According to an embodiment of the present disclosure as described above, the far-infrared specification unit 140 specifies the position of each of the plurality of respective second markers 920 in a far-infrared image on the basis of the geometric relationship between the plurality of respective first markers 910. Even in the case where a far-infrared image showing the chart 9 does not show some of the second markers 920, that makes it possible to specify the position of each marker in the far-infrared image. Therefore, it is also possible for a far-infrared image showing markers at the ends to specify the position of each marker in the far-infrared image. It is thus possible to sufficiently secure information used to calibrate the far-infrared camera 102. Accordingly, the calibration precision of the far-infrared camera 102 can be improved.

In addition, according to the chart 9 according to the present embodiment, the relative positions of the plurality of respective second markers 920 in a real space with respect to the plurality of first markers 910 can be decided on the basis of the geometric relationship between the plurality of respective first markers 910. That makes it possible to specify the position of each of the plurality of second markers 920 in a far-infrared image on the basis of the geometric relationship between the plurality of respective first markers 910. Therefore, even in the case where a far-infrared image showing the chart 9 does not some of the second markers 920, it is possible to specify the position of each marker in the far-infrared image. Accordingly, the calibration precision of the far-infrared camera 102 can be improved.

Note that the series of control processes by each device described in the present specification may be realized using any of software, hardware, and a combination of the software and the hardware. For example, a program included in software is stored in advance in a storage medium (non-transitory media) provided internally or externally in each device. Then, for example, each program is read to the RAM at the time of execution and is executed by a processor such as the CPU. One processor or a plurality of processors may be provided to execute the respective programs.

Specifically, a computer program for realizing the respective function of the image processing device 1 according to the present embodiment and the image processing devices 2 and 3 according to the respective application examples as described above can be produced and implemented on a PC or the like. The image processing device 1 according to the present embodiment or the image processing devices 2 and 3 according to the respective application examples can correspond to computers. In addition, a computer-readable recording medium having such a computer program stored therein can also be provided. Examples of the recording medium include a magnetic disk, an optical disc, a magneto-optical disc, a flash memory, and the like. In addition, the computer program described above may be distributed via, for example, a network without using a recording medium. In addition, the respective functions of the image processing device 1 according to the present embodiment or the image processing devices 2 and 3 according to the respective application examples may be divided to a plurality of computers. In that case, the respective functions of the plurality of computers can be realized in accordance with the computer program described above.

Moreover, the process described using the flowchart in the present specification may not necessarily be performed in the order shown in the flowchart. Some processing steps may be executed in parallel. For example, with respect to the flowchart illustrated in FIG. 16, the process of step S505 may be executed prior to the process of step S503 or may be executed in parallel to the process of step S503. In addition, with respect to the flowchart illustrated in FIG. 20, the process of step S605 (S609) may be executed prior to the process of step S603 (S607) or may be executed in parallel to the process of step S603 (S607). In addition, with respect to the flowchart illustrated in FIG. 24, the process of step S705 (S709) may be executed prior to the process of step S703 (S707) or may be executed in parallel to the process of step S703 (S707). Moreover, additional processing steps may be adopted or some of the processing steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing device including:

a far-infrared acquisition unit configured to acquire a far-infrared image;

a first extraction unit configured to extract a plurality of first markers having first temperature from the far-infrared image; and a far-infrared specification unit configured to specify a position of each of a plurality of second markers having second temperature in the far-infrared image on the basis of a geometric relationship between the plurality of respective first markers.

(2)

The image processing device according to (1), including:

a second extraction unit configured to extract a second marker candidate from the far-infrared image, the second marker candidate being a candidate for each of the plurality of second markers, in which the far-infrared specification unit includes an estimation unit configured to estimate a relationship between the second marker candidate extracted by the second extraction unit and each of the plurality of second markers on the basis of the geometric relationship between the plurality of respective first markers.

(3)

The image processing device according to (2), in which the far-infrared specification unit includes a generation unit configured to generate candidate information on the basis of the geometric relationship between the plurality of respective first markers, the candidate information being information indicating a candidate for the position of the second marker in the far-infrared image, and the estimation unit estimates the relationship on the basis of the candidate information.

(4)

The image processing device according to (2) or (3), in which the far-infrared specification unit includes a center specification unit configured to specify a central position of the second marker candidate as the position of the second marker in the far-infrared image, the position being associated according to the relationship estimated by the estimation unit.

(5)

The image processing device according to any one of (1) to (4), including:

a far-infrared calibration unit configured to calibrate a far-infrared camera on the basis of the position of each of the plurality of second markers in the far-infrared image, the far-infrared camera capturing the far-infrared image.

(6)

The image processing device according to (5), including:

the far-infrared camera.

(7)

The image processing device according to (5) or (6), including:

a visible light acquisition unit configured to acquire a visible light image;

a third extraction unit configured to extract the plurality of first markers from the visible light image; and a visible light specification unit configured to specify a position of each of the plurality of second markers in the visible light image on the basis of the geometric relationship between the plurality of respective first markers.

(8)

The image processing device according to (7), including:

a visible light calibration unit configured to calibrate a visible light camera on the basis of the position of each of the plurality of second markers in the far-infrared image and the position of each of the plurality of second markers in the visible light image, the visible light camera capturing the visible light image, in which the far-infrared calibration unit calibrates the far-infrared camera on the basis of the position of each of the plurality of second markers in the far-infrared image and the position of each of the plurality of second markers in the visible light image.

(9)

The image processing device according to (8), including:

the visible light camera.

(10)

The image processing device according to (5) or (6), including:

a near-infrared acquisition unit configured to acquire a near-infrared image;

a fifth extraction unit configured to extract the plurality of first markers from the near-infrared image; and a near-infrared specification unit configured to specify a position of each of the plurality of second markers in the near-infrared image on the basis of the geometric relationship between the plurality of respective first markers.

(11)

The image processing device according to (10), including:

a near-infrared calibration unit configured to calibrate a near-infrared camera on the basis of the position of each of the plurality of second markers in the far-infrared image and the position of each of the plurality of second markers in the near-infrared image, the near-infrared camera capturing the near-infrared image, in which the far-infrared calibration unit calibrates the far-infrared camera on the basis of the position of each of the plurality of second markers in the far-infrared image and the position of each of the plurality of second markers in the near-infrared image.

(12)

The image processing device according to (11), including:
the near-infrared camera.

(13)

A chart for calibration, the chart including:
a plurality of first markers configured to have first temperature;
a plurality of second markers configured to have second temperature; and
a base configured to have third temperature, and be provided with the plurality of first markers and the plurality of second markers, in which
relative positions of the plurality of respective second markers in a real space with respect to the plurality of first markers can be decided on the basis of a geometric relationship between the plurality of respective first markers.

(14)

The chart for calibration according to (13), in which
the number of the plurality of first markers provided to the base is three or more.

(15)

The chart for calibration according to (13) or (14), in which
the plurality of first markers, the plurality of second markers, and the base have different spectral reflection characteristics in a visible light region.

(16)

The chart for calibration according to any one of (13) to (15), in which
the plurality of first markers, the plurality of second markers, and the base have different spectral reflection characteristics in a near-infrared region.

(17)

A calibration system including:
a chart for calibration, the chart including a plurality of first markers configured to have first temperature, a plurality of second markers configured to have second temperature, and a base configured to have third temperature, and be provided with the plurality of first markers and the plurality of second markers; and
an image processing device configured to calibrate a far-infrared camera with a far-infrared image showing the chart for calibration, the far-infrared camera capturing the far-infrared image, in which
relative positions of the plurality of respective second markers in a real space with respect to the plurality of first markers can be decided on the basis of a geometric relationship between the plurality of respective first markers, and
the image processing device includes
a far-infrared acquisition unit configured to acquire the far-infrared image,
a first extraction unit configured to extract the plurality of first markers from the far-infrared image,
a far-infrared specification unit configured to specify a position of each of the plurality of second markers in the far-infrared image on the basis of the geometric relationship between the plurality of respective first markers, and a far-infrared calibration unit configured to calibrate the far-infrared camera on the basis of the position of each of the plurality of second markers in the far-infrared image.

REFERENCE SIGNS LIST 1, 2, 3 image processing device
9 chart
10 calibration system
102 far-infrared camera
104 input interface
106 memory
108 display
110 communication interface
112 storage
114 processor
116 bus
120 far-infrared acquisition unit
130 far-infrared extraction unit
131 first extraction unit
133 second extraction unit
140 far-infrared specification unit
141 first generation unit
143 first estimation unit
145 first center specification unit
150 far-infrared calibration unit
160 far-infrared storage unit
202 visible light camera
220 visible light acquisition unit
230 visible light extraction unit
231 third extraction unit
233 fourth extraction unit
240 visible light specification unit
241 second generation unit
243 second estimation unit
245 second center specification unit
250 visible light calibration unit
260 visible light storage unit
302 near-infrared camera
320 near-infrared acquisition unit
330 near-infrared extraction unit
331 fifth extraction unit
333 sixth extraction unit
340 near-infrared specification unit
341 third generation unit
343 third estimation unit
345 third center specification unit
350 near-infrared calibration unit
360 near-infrared storage unit
820 second marker candidate
910 first marker
920 second marker
930 base
941 first resistor
942 second resistor
950 battery

The invention claimed is:

1. An image processing device, comprising:
at least one processor configured to:
acquire a far-infrared image and a visible light image;
allocate a first pixel value to each pixel that has a pixel value lower than a threshold value in the far-infrared image;
allocate a second pixel value to each pixel that has a pixel value higher than or equal to the threshold value in the far-infrared image, wherein the first pixel value is lower than the second pixel value;

extract, based on the allocation of the first pixel value and the second pixel value, a plurality of first markers having a first temperature from the far-infrared image;

extract the plurality of first markers having a first color from the visible light image; and specify a position of each of a plurality of second markers, having both a second temperature in the far-infrared image and a second color in the visible light image, based on a geometric relationship between the plurality of first markers, wherein the threshold value is set at the pixel value which corresponds to a temperature that is lower than the first temperature of the plurality of first markers and higher than the second temperature of the plurality of second markers, and a first marker of the plurality of first markers is distinguishable from a second marker of the plurality of second markers based on both of: a difference between the first temperature and the second temperature, and a difference between the first color and the second color.

2. The image processing device according to claim 1, wherein the at least one processor is further configured to:
extract a second marker candidate from the far-infrared image, wherein
the second marker candidate is a candidate for each of the plurality of second markers; and
estimate a relationship between the second marker candidate and each of the plurality of second markers based on the geometric relationship between the plurality of first markers.

3. The image processing device according to claim 2, wherein the at least one processor is further configured to:
generate candidate information based on the geometric relationship between the plurality of first markers, wherein
the candidate information indicates the candidate for the position of the second marker of the plurality of second markers in the far-infrared image; and
estimate the relationship based on the candidate information.

4. The image processing device according to claim 2, wherein the at least one processor is further configured to
specify a central position of the second marker candidate as the position of the second marker of the plurality of second markers in the far-infrared image, wherein
the position is associated based on the estimated relationship.

5. The image processing device according to claim 1, wherein the at least one processor is further configured to
calibrate a far-infrared camera based on the position of each of the plurality of second markers in the far-infrared image, wherein
the far-infrared camera captures the far-infrared image.

6. The image processing device according to claim 5, further comprising the far-infrared camera.

7. The image processing device according to claim 5, wherein the at least one processor is further configured to:
specify the position of each of the plurality of second markers in the visible light image based on the geometric relationship between the plurality of first markers.

8. The image processing device according to claim 7, wherein the at least one processor is further configured to:

calibrate a visible light camera based on the position of each of the plurality of second markers in the far-infrared image and the position of each of the plurality of second markers in the visible light image, wherein the visible light camera captures the visible light image; and calibrate the far-infrared camera based on the position of each of the plurality of second markers in the far-infrared image and the position of each of the plurality of second markers in the visible light image.

9. The image processing device according to claim 8, further comprising the visible light camera.

10. The image processing device according to claim 5, wherein the at least one processor is further configured to:
acquire a near-infrared image;
extract the plurality of first markers from the near-infrared image; and
specify the position of each of the plurality of second markers in the near-infrared image based on the geometric relationship between the plurality of first markers.

11. The image processing device according to claim 10, wherein the at least one processor is further configured to:
calibrate a near-infrared camera based on the position of each of the plurality of second markers in the far-infrared image and the position of each of the plurality of second markers in the near-infrared image, wherein
the near-infrared camera captures the near-infrared image; and
calibrate the far-infrared camera based on the position of each of the plurality of second markers in the far-infrared image and the position of each of the plurality of second markers in the near-infrared image.

12. The image processing device according to claim 11, further comprising the near-infrared camera.

13. The image processing device according to claim 1, wherein the at least one processor is further configured to specify the position of at least one second marker of the plurality of second markers, not shown in the far-infrared image, based on the geometric relationship between the plurality of first markers.

14. A calibration system, comprising:
a chart for calibration, wherein the chart includes:
a plurality of first markers configured to have a first temperature in a far-infrared region and a first color in a visible light region,
a plurality of second markers configured to have a second temperature in the far-infrared region and a second color in the visible light region, and
a base configured to have a third temperature, wherein the plurality of first markers and the plurality of second markers are on the base; and
an image processing device configured to calibrate a far-infrared camera with a far-infrared image that shows the chart for the calibration, wherein
the far-infrared camera captures the far-infrared image,
relative positions of the plurality of second markers in a real space with respect to the plurality of first markers based on a geometric relationship between the plurality of first markers, and
the image processing device includes at least one processor configured to:
acquire the far-infrared image;
allocate a first pixel value to each pixel that has a pixel value lower than a threshold value in the far-infrared image;

allocate a second pixel value to each pixel that has a pixel value higher than or equal to the threshold value in the far-infrared image, wherein the first pixel value is lower than the second pixel value, and the threshold value is set at the pixel value which corresponds to a temperature that is lower than the first temperature of the plurality of first markers and higher than the second temperature of the plurality of second markers;

extract, based on the allocation of the first pixel value and the second pixel value, the plurality of first markers having the first temperature from the far-infrared image;

extract the plurality of first markers having the first color from a visible light image;

specify a position of each of the plurality of second markers, having both the second temperature in the far-infrared image and the second color in the visible light image, based on the geometric relationship between the plurality of first markers; and calibrate the far-infrared camera based on the position of each of the plurality of second markers in the far-infrared image, wherein a first marker of the plurality of first markers is distinguishable from a second marker of the plurality of second markers based on both of: a difference between the first temperature and the second temperature, and a difference between the first color and the second color.

* * * * *